(12) United States Patent
Yamano

(10) Patent No.: US 7,212,529 B2
(45) Date of Patent: May 1, 2007

(54) SYSTEM FOR RETRIEVING DESTINATION OF A PACKET WITH PLURAL HEADERS

(75) Inventor: Shigeki Yamano, Tokyo (JP)

(73) Assignee: NEC Corporation (JP)

( * ) Notice: Subject to any disclaimer, the term of this patent is extended or adjusted under 35 U.S.C. 154(b) by 1074 days.

(21) Appl. No.: 10/299,368

(22) Filed: Nov. 18, 2002

(65) Prior Publication Data

US 2003/0095548 A1 May 22, 2003

(30) Foreign Application Priority Data

Nov. 16, 2001 (JP) .............................. 2001-352197

(51) Int. Cl.
  H04L 12/28 (2006.01)
  H04L 12/56 (2006.01)
(52) U.S. Cl. ...................... 370/389; 370/401
(58) Field of Classification Search ................ 370/389, 370/392, 400, 401, 428, 429, 412–416
  See application file for complete search history.

(56) References Cited

U.S. PATENT DOCUMENTS

| 6,307,855 B1 * | 10/2001 | Hariguchi | 370/392 |
| 6,418,145 B1 | 7/2002 | Isoyama et al. | |
| 2002/0118682 A1* | 8/2002 | Choe | 370/395.31 |
| 2003/0152078 A1* | 8/2003 | Henderson et al. | 370/389 |
| 2006/0126644 A1* | 6/2006 | Akahane et al. | 370/395.53 |

FOREIGN PATENT DOCUMENTS

| EP | 1001576 A2 | 1/2000 |
| JP | 2000244571 | 9/2000 |

OTHER PUBLICATIONS

English translation of Abstract of Japanese Laid-Open Publication No. 2000-244571 dated Sep. 8, 2000.
English translation of Abstract of Japanese Publication No. 2000-151709 dated May 30, 2000.
English translation of Abstract of Japanese Publication No. 11-187024 dated Jul. 9, 1999.

* cited by examiner

*Primary Examiner*—Ajit Patel
(74) *Attorney, Agent, or Firm*—Ostrolenk, Faber, Gerb & Soffen, LLP

(57) ABSTRACT

A destination address retrieving system generates a retrieval key from a header information of a packet and performs a retrieval to an address information table based on the key and receives a returned value. If the returned value indicates the presence of any internal header, then the address retrieving unit further generates another retrieval key from an internal header information of the packet, for performing another retrieval to another address information table.

12 Claims, 16 Drawing Sheets

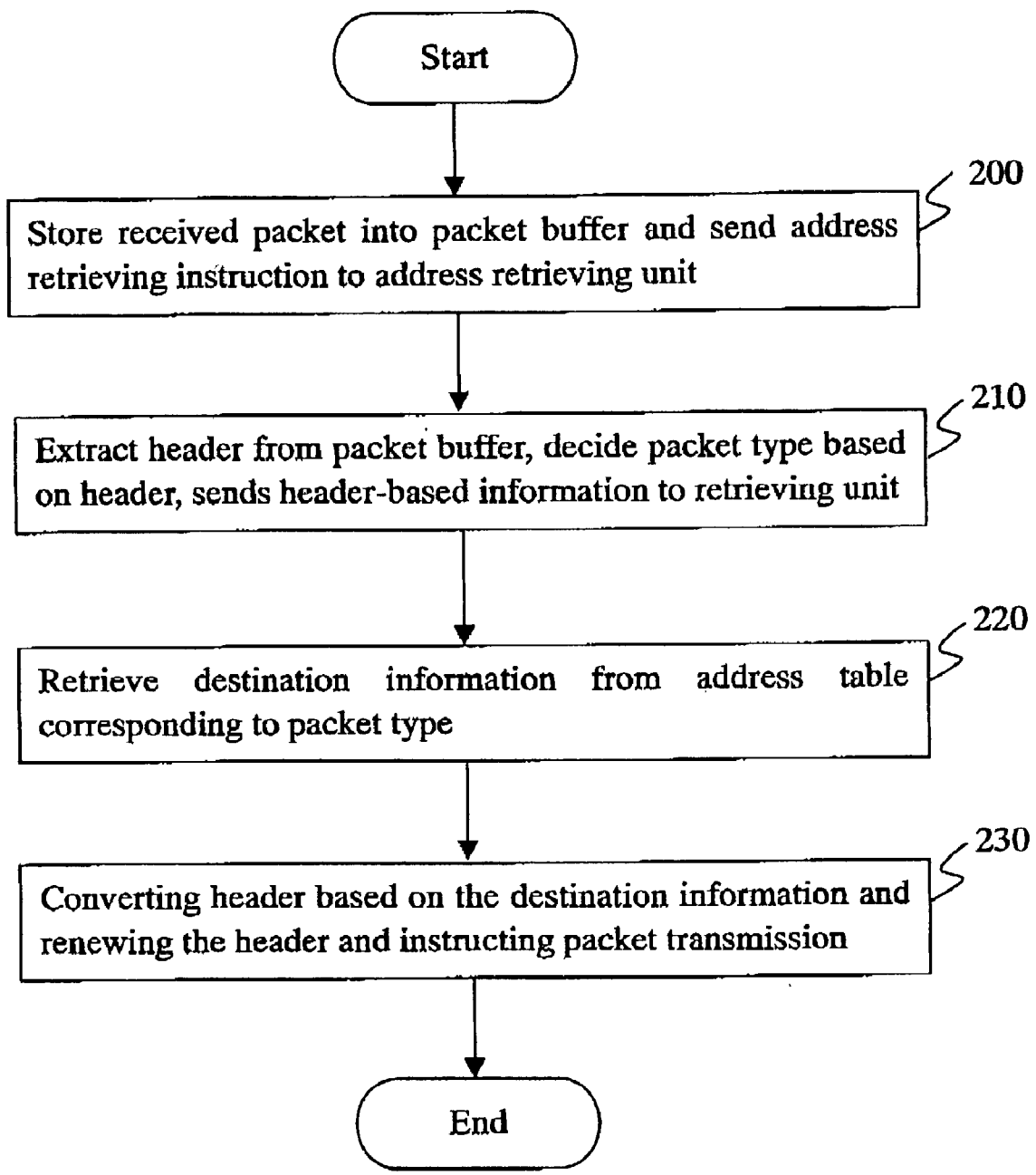

FIG. 12

| first stage address | second stage address | third stage address | ------- |
|---|---|---|---|
| first stage address | don't care | don't care | ------- |
| first stage address | second stage address | don't care | ------- |

SYSTEM FOR RETRIEVING DESTINATION OF A PACKET WITH PLURAL HEADERS

BACKGROUND OF THE INVENTION

1. Field of the Invention

The present invention relates to a system for retrieving a destination address, to which a packet will be transmitted, and more particularly to a destination retrieving system realizing a desired high speed retrieving process for retrieving a destination address, to which a packet with plural headers will be transmitted.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

Destination retrieving systems have been used for designating or deciding one or more destinations, to which one or more packets will be transmitted, based on contents described in a packet header. Examples of the conventional destination retrieving systems are disclosed in Japanese laid-open patent publication No. 11-187024, and Japanese laid-open patent publication No. 2000-244571, as well as Japanese laid-open patent publication No. 2000-151709.

Typical one of the conventional destination retrieving systems will, hereinafter, be described with reference to the drawings. FIG. 1 shows the typical one of the conventional destination retrieving systems. The conventional destination retrieving system includes a packet buffer 100, a destination address retrieving unit 110, a destination address information storage unit 120, a packet receiving unit 130, a packet transmitting unit 140, and a central processing unit 150.

The packet receiving unit 130 receives a destination-undecided packet, for which a decision to a destination address has not yet been made but the decision is needed for transmitting the packet. The packet buffer 100 is functionally coupled to the packet receiving unit 130 for receiving the packet from the packet receiving unit 130 and storing the packet therein. The packet buffer 100 comprises a storage unit for storing the packet received by the packet receiving unit 130.

The packet transmitting unit 140 is functionally coupled to the packet buffer 100 for receiving the packet from the packet buffer 100. The packet transmitting unit 140 is also functionally coupled to the central processing unit 150. The packet transmitting unit 140 is capable of transmitting a destination-decided packet, for which a decision to the destination address for transmission has already been made. The packet transmitting unit 140 is also capable of transferring, to the central processing unit 150, a destination-undecidable packet, for which any decision to destination address for packet transmission could not be made.

The destination address retrieving unit 110 is functionally coupled to the packet buffer 100 for making a decision of a destination address of the destination-undecided packet stored in the packet buffer 100. The destination address retrieving unit 110 is further functionally coupled to the packet receiving unit 130 and also to the packet transmitting unit 140. The destination address information storage unit 120 is functionally coupled to the destination address retrieving unit 110. The destination address information storage unit 120 may store a plurality of destination address information table which enables the destination address retrieving unit 110 to retrieve a destination address for the destination-undecided packet stored in the packet buffer 100 based on the destination address information table. The central processing unit 150 is functionally coupled to the packet buffer 100. The central processing unit 150 processes only a destination-undecidable packet, for which any decision to destination address for packet transmission could not be made by the destination address retrieving unit 110. The process is executed in accordance with a given program.

The destination address retrieving unit 110 has an internal function-block structure shown in FIG. 2. As described above, the destination address retrieving unit 110 is functionally coupled to the packet buffer 100, the destination address information storage unit 120, the packet receiving unit 130 and the packet transmitting unit 140. The destination address retrieving unit 110 includes a packet-header-extracting/retrieving-method-deciding unit 111, a table-selecting/destination-retrieving unit 112 and a packet header converting unit 113.

The packet-header-extracting/retrieving-method-deciding unit 111 is functionally coupled to the packet receiving unit 130 for receiving a destination address retrieving instruction from the packet receiving unit 130. The packet-header-extracting/retrieving-method-deciding unit 111 is also functionally coupled to the packet buffer 100 for extracting a packet header from the packet stored in the packet buffer 100, so that the packet-header-extracting/retrieving-method-deciding unit 111 decides a packet type from the packet header. A location and a size of the destination address as well as the number of necessary informations such as addresses for deciding the destination are variable depending upon the packet type. For this reason, the packet-header-extracting/retrieving-method-deciding unit 111 previously decides a location and a size of the destination address as well as the number and extraction location of the other necessary informations for enabling the table-selecting/destination-retrieving unit 112 to perform table-selecting and destination-retrieving processes based on those informations. The retrieving method is represented by those retrieving-purpose informations necessary for the destination address retrieval. Thus, the retrieving method corresponds to retrieval keys, based on which the table-selecting/destination-retrieving unit 112 performs the destination-retrieving process. Typical examples of the existent packet types are Internet Protocol version 4 (IPv4), Internet Protocol version 6 (IPv6) and Multiprotocol Label Switching.

The table-selecting/destination-retrieving unit 112 is functionally coupled to the packet-header-extracting/retrieving-method-deciding unit 111 for receiving, from the packet-header-extracting/retrieving-method-deciding unit 111, the retrieving-purpose informations including the packet type and the address of the packet header. The table-selecting/destination-retrieving unit 112 is also functionally coupled to the destination address information storage unit 120 which stores a plurality of destination address information table. The table-selecting/destination-retrieving unit 112 selects a destination address information table 121 based on the designated retrieving method from the plurality of destination address information table stored in the destination address information storage unit 120.

As described above, the retrieving method is designated or decided by the packet-header-extracting/retrieving-method-deciding unit 111 based on the packet type designated in the packet header given from the packet buffer 100. Namely, the table-selecting/destination-retrieving unit 112 selects the destination address information table 121 based on the packet type or the designated retrieving method. The table-selecting/destination-retrieving unit 112 performs retrieval of a destination address for the packet based on the selected destination address information table 121.

The packet header converting unit 113 is functionally coupled to the table-selecting/destination-retrieving unit 112 for receiving the retrieved destination address as well as the header and the packet type from the table-selecting/destination-retrieving unit 112. The packet header converting unit 113 is also functionally coupled to the packet buffer 100 for performing an editorial process for the header based on the retrieved destination address and a header-renewal process for renewing the header necessary for the packet transmission of the packet stored in the packet buffer 100. The packet header converting unit 113 is also functionally coupled to the packet transmitting unit 140 for sending a packet transmission instruction to the packet transmitting unit 140 after the both editorial and renewal processes described above have been completed.

Operations of the above-described conventional destination retrieving system of FIGS. 1 and 2 will subsequently be described with reference to FIG. 3.

In step 200, after the packet receiving unit 130 has received a destination-undecided packet, then the packet receiving unit 130 transfers the received destination-undecided packet to the packet buffer 100, so that the packet buffer 100 stores the packet therein. The packet receiving unit 130 also sends a destination address retrieving instruction to the destination address retrieving unit 110.

In step 210, the packet-header-extracting/retrieving-method-deciding unit 111 receives the destination address retrieving instruction from the packet receiving unit 130. In accordance with the destination address retrieving instruction, the packet-header-extracting/retrieving-method-deciding unit 11 extracts a packet header from the packet stored in the packet buffer 100, so that the packet-header-extracting/retrieving-method-deciding unit 111 decides a packet type from the packet header. The packet-header-extracting/retrieving-method-deciding unit 111 sends the packet type and the address of the packet header to the table-selecting/destination-retrieving unit 112.

In step 220, the table-selecting/destination-retrieving unit 112 selects a destination address information table 121 based on the address from the plurality of destination address information table stored in the destination address information storage unit 120. The table-selecting/destination-retrieving unit 112 retrieves a destination address for the packet based on the selected destination address information table 121.

In step 230, after the retrieval of the destination address has been completed, then the packet header converting unit 113 receives the retrieved destination address from the table-selecting/destination-retrieving unit 112 as well as receives the header and the packet type from the packet-header-extracting/retrieving-method-deciding unit 111. The packet header converting unit 113 performs an editorial process for the header based on the retrieved destination address and a header-renewal process necessary for renewing the header necessary for the packet transmission of the packet stored in the packet buffer 100. The packet header converting unit 113 sends a packet transmission instruction to the packet transmitting unit 140 after the both editorial and renewal processes described above have been completed.

In accordance with the packet transmission instruction from the packet header converting unit 113, the packet transmitting unit 140 transmits the packet stored in the packet buffer 100 to the destination address. If the destination address of the packet could not be decided or designated by the destination address retrieving unit 110, then the packet stored in the packet buffer 100 is processed by the central processing unit 150 in accordance with a program.

In the meantime, the packets be classified into a first type packet which has a single-stage header structure and a second type packet which has a multi-stage header structure. FIG. 4A is a view of the first type packet with the single-stage header structure. FIG. 4B is a view of the second type packet with the multi-stage header structure. As shown in FIG. 4A, a first type packet 300 has a single header 301 which needs a decision of any destination address. As shown in FIG. 4B, a second type packet 310 has both internal and external headers 312 and 311 which need decisions of respective destination addresses, wherein the internal header 312 is capsuled with the outer header 311, while the outer header 311 capsules the internal header 312.

FIG. 5 is a diagram of a plurality of first-type network, over which address of the internal header is effective, and a single second-type network, over which address of the external header is effective. Address of the internal header 312 is effective over the first-type networks 410, 420 and 430. Address of the internal header 311 is effective over the second type network 400. The packet 300 with the single stage header 301 is effective over the first-type networks 410, 420 and 430 only. The packet 310 with the internal and external headers 312 and 311 is effective over not only the first-type networks 410, 420 and 430 but also the second-type network 400. Packet switches 415, 425 and 435 are provided between the second-type network 400 and the first-type networks 410, 420 and 430 respectively. Each of the packet switches 415, 425 and 435 is capable of capsuling or de-capsuling the external header 311 onto or from the internal header 312 for enabling the packet to be effective over the second-type network 400 or the first-type networks 410, 420 and 430.

The above-described conventional destination retrieving system is effective only to perform a high speed process for deciding or designating the destination address for the single-stage packet 300 which has the single header 301 which needs a decision of any destination address. The above-described conventional destination retrieving system is, however, ineffective in view of high speed processes for the multi-stage packet 310 because each of the packet switches 415, 425 and 435.

FIG. 6 is a flow chart of operations of the packet switch for capsuling or de-capsuling the external header onto or from the internal header for enabling the packet to be effective over the second-type network or the first-type networks shown in FIG. 5. Each of the packet switches 415, 425 and 435 is capable of capsuling the external header 311 onto the internal header 312 for enabling the packet to be effective over the second-type network 400 or de-capsuling the external header 311 from the internal header 312 for enabling the packet to be effective over the first-type networks 410, 420 and 430. The following operations by each of the packet switches 415, 425 and 435 is implemented by the central processing unit 150 shown in FIG. 1.

In step 500, the central processing unit 150 decides whether or not the received packet is the packet transmitted from the second type network 400, over which the address of the external header is effective.

In step 510, if the central processing unit 150 has made a decision to the effect that the received packet is not the packet transmitted from the second type network 400, the central processing unit 150 retrieves the contents of the internal header.

In step 520, the central processing unit 150 decides whether or not the packet is needed to be transferred to the second type network 400, over which the address of the external header is effective.

In step 540, if the central processing unit 150 decides that the packet is not needed to be transferred to the second type network 400, then the central processing unit 150 transfers the packet to the first type network 410, 420 or 430.

In step 530, if the central processing unit 150 decides that the packet is needed to be transferred to the second type network 400, then the central processing unit 150 capsules or adds the external header to the packet.

In step 580, the central processing unit 150 transfers the packet with the external header to the second type network 400.

In step 550, if the central processing unit 150 has made another decision to the effect that the received packet is the packet transmitted from the second type network 400, the central processing unit 150 retrieves the contents of the external header.

In step 560, the central processing unit 150 decides whether or not the packet is needed to be transferred to the first type network 410, 420 or 430, over which the address of the internal header is effective.

In step 580, if the central processing unit 150 decides that the packet is not needed to be transferred to the first type network 410, 420 or 430, then the central processing unit 150 transfers the packet to the second type network 400.

In step 570, if the central processing unit 150 decides that the packet is needed to be transferred to the first type network 410, 420 or 430, then the central processing unit 150 de-capsules or deletes the external header from the packet.

In step 580, the central processing unit 150 transfers the packet with the external header to the first type network 410, 420 or 430.

In general, the last-mentioned process by the central processing unit 150 to the packet is remarkably slower than the above-mentioned process by the destination address retrieving unit 110. If the packet has the single-stage header structure or the single header, then the destination address retrieving unit 110 is capable of retrieving the destination address. If the packet has the plural-stage header structure or the plural headers, then the destination address retrieving unit 110 is incapable of retrieving the destination address, and the central processing unit 150 is needed to perform the processes described above and with reference to FIG. 6.

Consequently, the above-described conventional destination retrieving system is incapable of high speed process for retrieving a destination address for a packet which has a plurality of header.

In the above circumstances, the development of a novel destination retrieving system free from the above problems is desirable.

SUMMARY OF THE INVENTION

Accordingly, it is an object of the present invention to provide a novel destination retrieving system free from the above problems.

It is a further object of the present invention to provide a novel destination retrieving system capable of high speed process for retrieving a destination address for a packet which has a plurality of header.

It is a still further object of the present invention to provide a novel destination retrieving system capable of high speed process for retrieving a destination address for a packet which has a plurality of header without any process by a central processing unit.

It is yet a further object of the present invention to provide a novel destination retrieving system capable of an improved high quality transmission of a packet with a single stage header.

A first aspect of the present invention is a system for retrieving a destination address of a packet. The system comprises: a packet storage unit for storing a packet which has plural-staged headers having respective destination addresses; an address information storage unit for storing a plurality of address information table, which stores address informations for each header; and an address retrieving unit functionally coupled to the packet storage unit and the address information storage unit. The address retrieving unit generates at least one first-retrieval key from an external header information of the packet stored in the packet storage unit. The address retrieving unit also performs a first-retrieval to at least one of the plurality of address information table based on the at least one first-retrieval key and receives a first-returned value, which depends upon a first-retrieval result made, from the address information storage unit, the first-returned value indicating the presence or absence of any internal header in the packet. If the returned value indicates the presence of any internal header in the packet, then the address retrieving unit further generates at least one second-retrieval key from an internal header information of the packet, so that the address retrieving unit also performs a second-retrieval to at least other one of the plurality of address information table based on the at least one second-retrieval key and receives a second-returned value, which depends upon a second-retrieval result made, from the address information storage unit, the second-returned value indicates the presence or absence of any further internal header in the packet. If the returned value indicates the absence of any internal header in the packet, then the address retrieving unit outputs a retrieval result.

It is preferable that the address retrieving unit further comprises: a retrieval key generating unit generating at least one first-retrieval key from an external header information of the packet stored in the packet storage unit in accordance with an address retrieval instruction, and the retrieval key generating unit further generating at least one second-retrieval key from an internal header information of the packet; and a retrieving unit functionally coupled to the retrieval key generating unit, the retrieving unit performing a first-retrieval to at least one of the plurality of address information table and receiving the first-returned value, which depends upon a retrieval result made, from the address information storage unit, and the retrieving unit also performing the second-retrieval to at least other one of the plurality of address information table based on the at least one second-retrieval key and receives a second-returned value, which depends upon a second-retrieval result made, from the address information storage unit.

It is also preferable that the address retrieving unit further more comprises: a header converting unit functionally coupled to the retrieving unit for receiving the retrieval result from the retrieving unit, and the header converting unit rewriting a header of the packet stored in the packet storage unit based on the retrieving result.

It is also preferable that the address retrieving unit comprises a hardware.

A second aspect of the present invention is a system for retrieving a destination address of a packet. The system comprises: a packet storage unit for storing a packet which has plural-staged headers having respective destination addresses; an address information storage unit for storing a plurality of plural-stage address information table, which stores address informations for plural headers on plural stages; and an address retrieving unit functionally coupled to the packet storage unit and the address information storage unit. The address retrieving unit batch-extracts data for the plural headers on the plural stages from the address information storage unit and performs a batch-retrieval to at least one of the plurality of plural-stage address information table based on the data for the plural headers.

It is preferable that the address retrieving unit further comprises: a header data extracting unit for batch-extracting the data for the plural headers on the plural stages from the address information storage unit; and a retrieving unit functionally coupled to the header data extracting unit for receiving the data for the plural headers and performing a batch-retrieval to the at least one of the plurality of plural-stage address information table based on the data for the plural headers.

It is also preferable that the address retrieving unit furthermore comprises: a header converting unit functionally coupled to the retrieving unit for receiving a retrieval result from the retrieving unit, and the header converting unit rewriting a header of the packet stored in the packet storage unit based on the retrieving result.

It is also preferable that the address retrieving unit comprises a hardware.

A third aspect of the present invention is a system for retrieving a destination address of a packet. The system comprises: a packet receiving unit for receiving a packet which has plural-staged headers having respective destination addresses; a packet storage unit functionally coupled to the packet receiving unit for receiving the packet from the packet receiving unit and storing the packet; an address information storage unit for storing a plurality of address information table, which stores address informations for each header; and an address retrieving unit functionally coupled to the packet storage unit and the address information storage unit and further to the packet receiving unit. The address retrieving unit generates at least one retrieval key from a header information of a header at a position designated by an extracting-position designating information given to the packet stored in the packet storage unit. The address retrieving unit also performs a retrieval to at least one of the plurality of address information table based on the at least one retrieval key and receives a returned value, which depends upon a retrieval result made, from the address information storage unit, the first-returned value indicating the presence or absence of any internal header in the packet. If the returned value indicates the presence of any internal header in the packet, then the address retrieving unit provides the packet with a new extracting-position designating information and sends the packet to the packet receiving unit.

It is preferable that the address retrieving unit further comprises: a retrieval key generating unit generating at least one retrieval key from a header information of a header at a position designated by an extracting-position designating information given to the packet stored in the packet storage unit; a retrieving unit functionally coupled to the retrieval key generating unit, the retrieving unit performing a retrieval to at least one of the plurality of address information table and receiving the returned value, which depends upon a retrieval result made, from the address information storage unit, and the retrieving unit also issuing a feed-back process instruction; and a transferring unit functionally coupled to the retrieving unit for receiving the feed-back process instruction from the retrieving unit and providing the packet with a new extracting-position designating information and sends the packet to the packet receiving unit.

It is further preferable that the address retrieving unit further comprises: a header converting unit functionally coupled to the retrieving unit for receiving the retrieval result from the retrieving unit, and the header converting unit rewriting a header of the packet stored in the packet storage unit based on the retrieving result.

It is also preferable that the address retrieving unit comprises a hardware.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 3 is a flow chart of operations of the conventional destination retrieving system of FIGS. 1 and 2.

FIG. 12 is a view of address retrieval entries stored in each multi-stage destination address information table stored in the destination address information storage unit shown in FIG. 11.

DETAILED DESCRIPTION OF THE PREFERRED EMBODIMENTS

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

Figure 1:
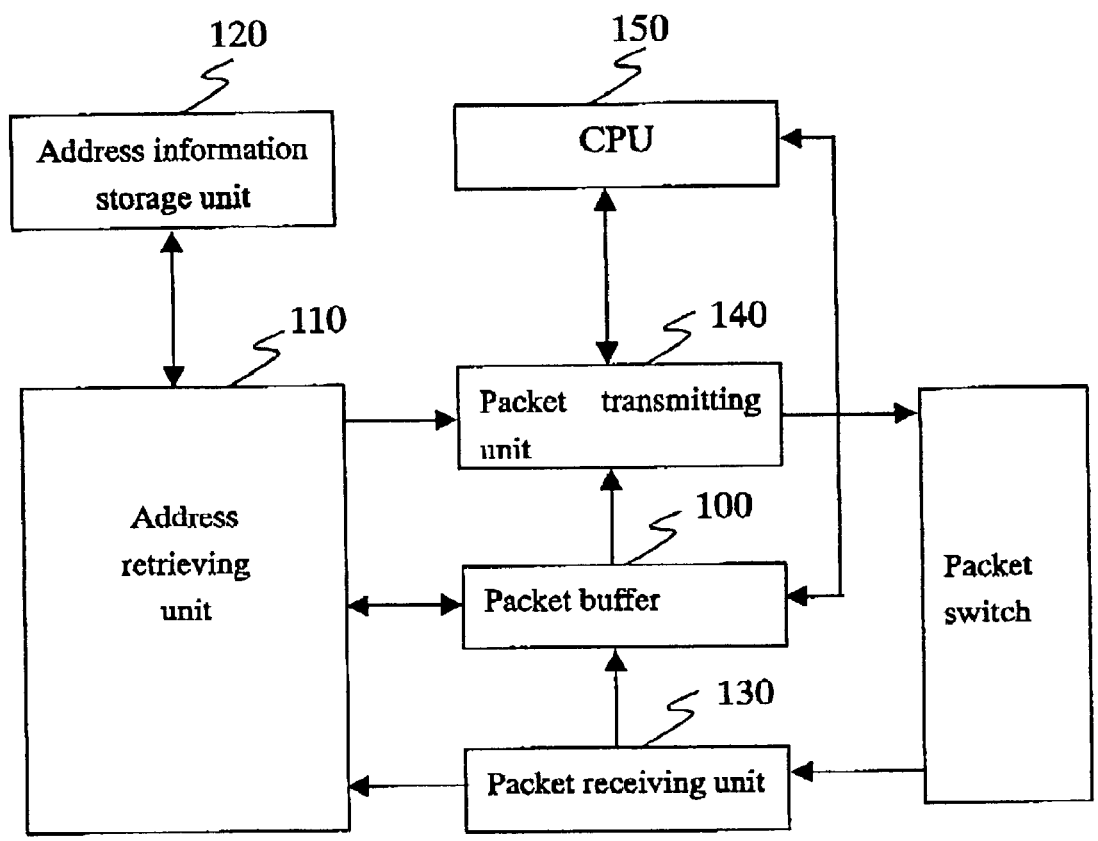
FIG. 1 is a block diagram illustrative of typical one of the conventional destination retrieving systems.
Figure 2:
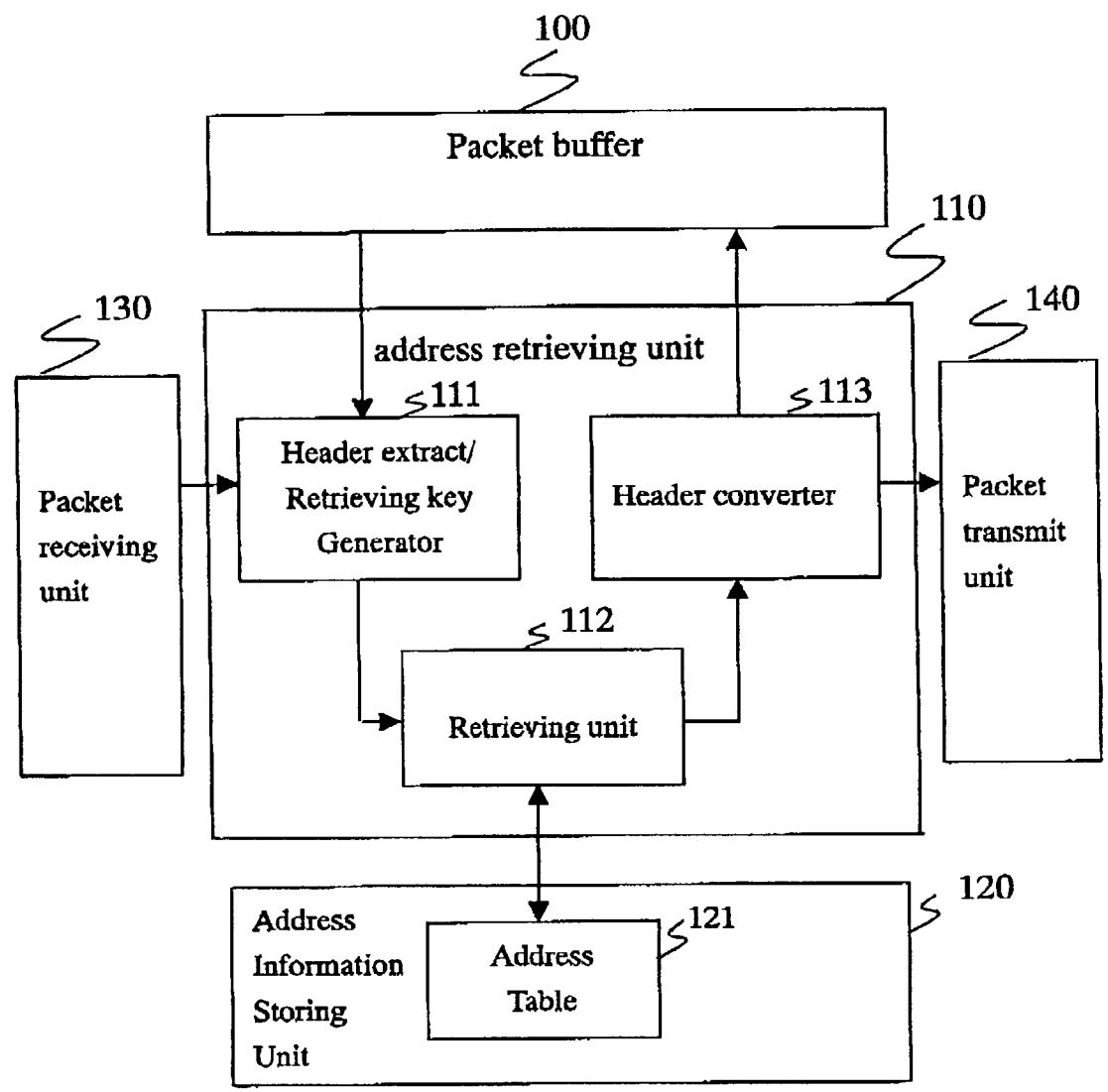
FIG. 2 is a block diagram illustrative of an internal block structure of the destination address retrieving unit included in the conventional destination retrieving system of FIG. 1.
Figure 4A:
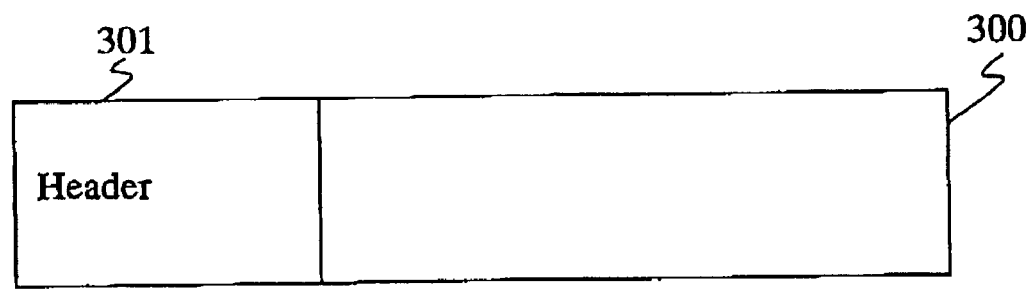
FIG. 4A is a view of the first type packet with the single-stage header structure.
Figure 4B:
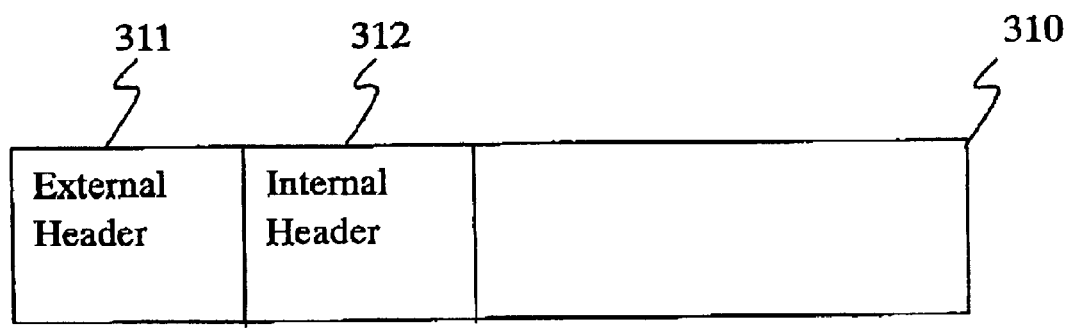
FIG. 4B is a view of the second type packet with the multi-stage header structure.
Figure 5:
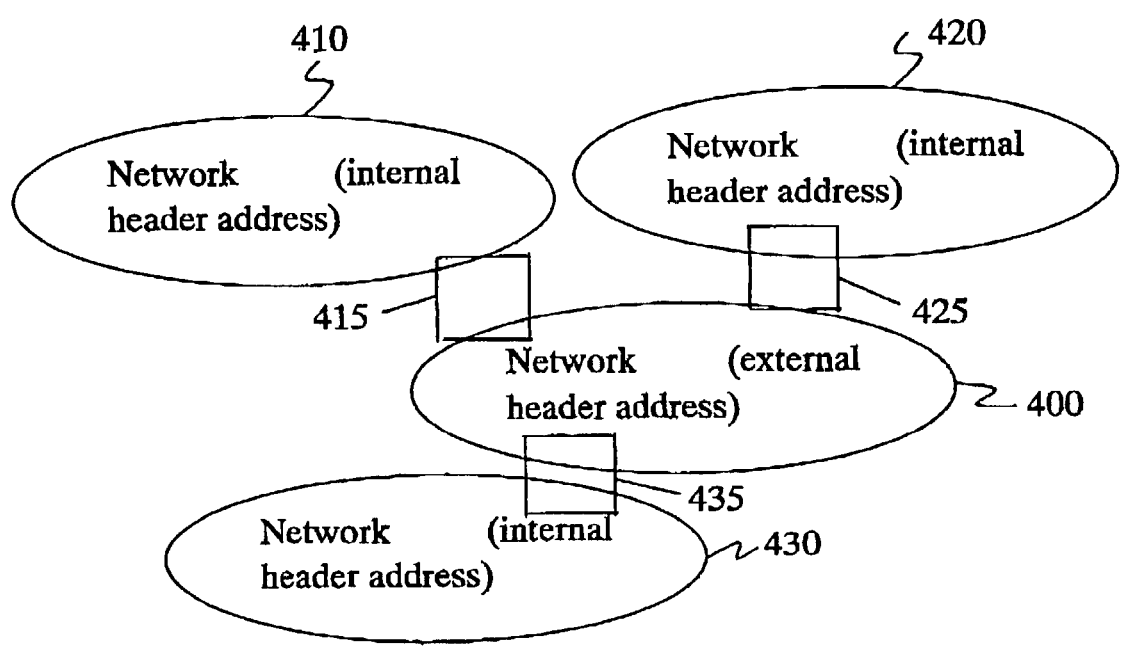
FIG. 5 is a diagram of a plurality of first-type network, over which address of the internal header is effective, and a single second-type network, over which address of the external header is effective.
Figure 6:
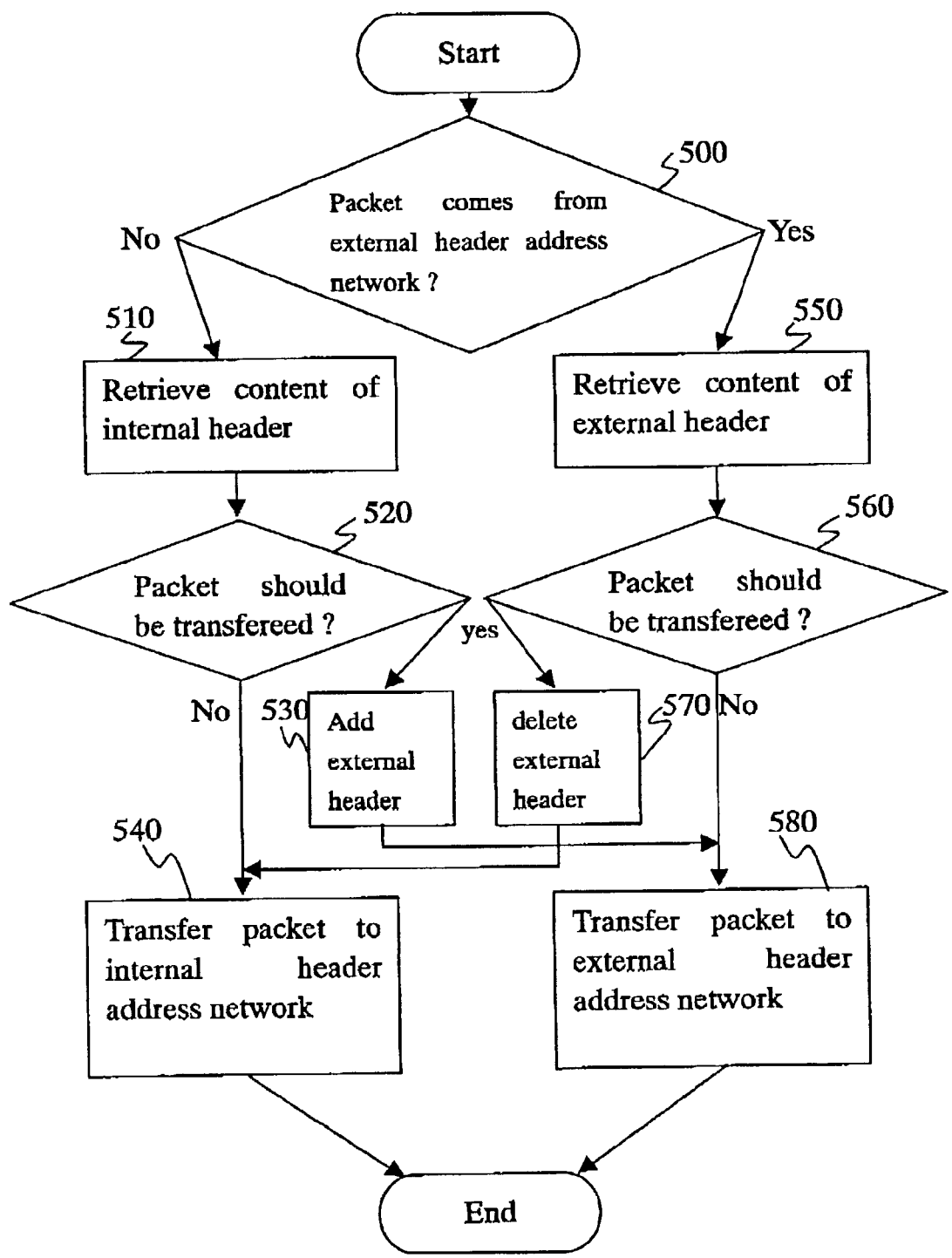
FIG. 6 is a flow chart of operations of the packet switch for capsuling or de-capsuling the external header onto or from the internal header for enabling the packet to be effective over the second-type network or the first-type networks shown in FIG. 5.
Figure 7:
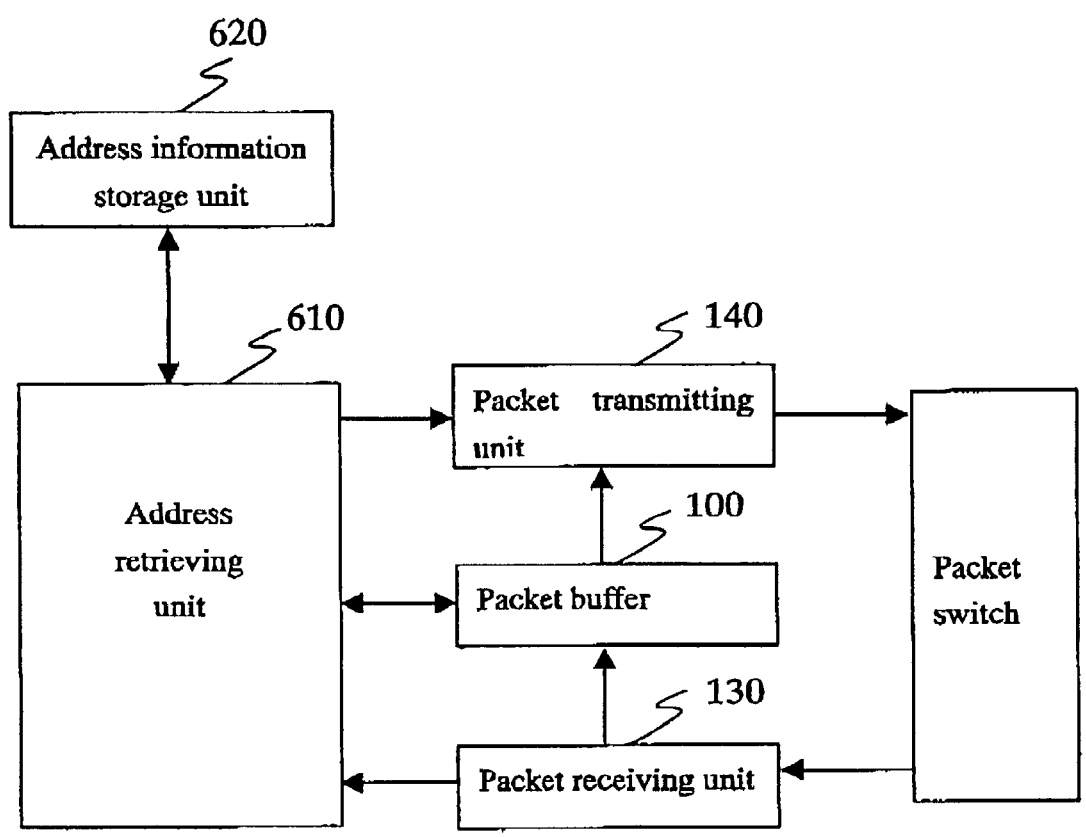
FIG. 7 is a block diagram showing a novel destination retrieving system in accordance with the first embodiment of the present invention.

First Embodiment:

A first embodiment according to the present invention will be described in detail with reference to the drawings. In accordance with the first embodiment of the present invention, a destination retrieving system will, hereinafter, be described with reference to the drawings. FIG. 7 shows a novel destination retrieving system in accordance with the first embodiment of the present invention. The novel destination retrieving system includes a packet buffer 100, a multi-stage destination address retrieving unit 610, a destination address information storage unit 620, a packet receiving unit 130 and a packet transmitting unit 140.

The packet receiving unit 130 receives, from the packet switch, a destination-undecided packet, for which a decision to a destination address has not yet been made but the decision is needed for transmitting the packet. The packet buffer 100 is functionally coupled to the packet receiving unit 130 for receiving the packet from the packet receiving unit 130 and storing the packet therein. The packet buffer 100 comprises a storage unit for storing the packet received by the packet receiving unit 130.

The packet transmitting unit 140 is functionally coupled to the packet buffer 100 for receiving the packet from the packet buffer 100. The packet transmitting unit 140 is capable of transmitting, to the packet switch, a destination-decided packet, for which a decision of the destination address for transmission has already been made.

The multi-stage destination address retrieving unit 610 is functionally coupled to the packet buffer 100 for making a decision of a destination address of the destination-undecided packet stored in the packet buffer 100. The multi-stage destination address retrieving unit 610 is further functionally coupled to the packet receiving unit 130 and also to the packet transmitting unit 140. The multi-stage destination address retrieving unit 610 may be realized by a hardware. The destination address information storage unit 620 is functionally coupled to the multi-stage destination address retrieving unit 610. The destination address information storage unit 620 may, for example, comprise a content addressable memory. The destination address information storage unit 620 may store a plurality of destination address information table which enables the multi-stage destination address retrieving unit 610 to retrieve destination addresses for the destination-undecided packet stored in the packet buffer 100 based on the destination address information tables.

Figure 8:
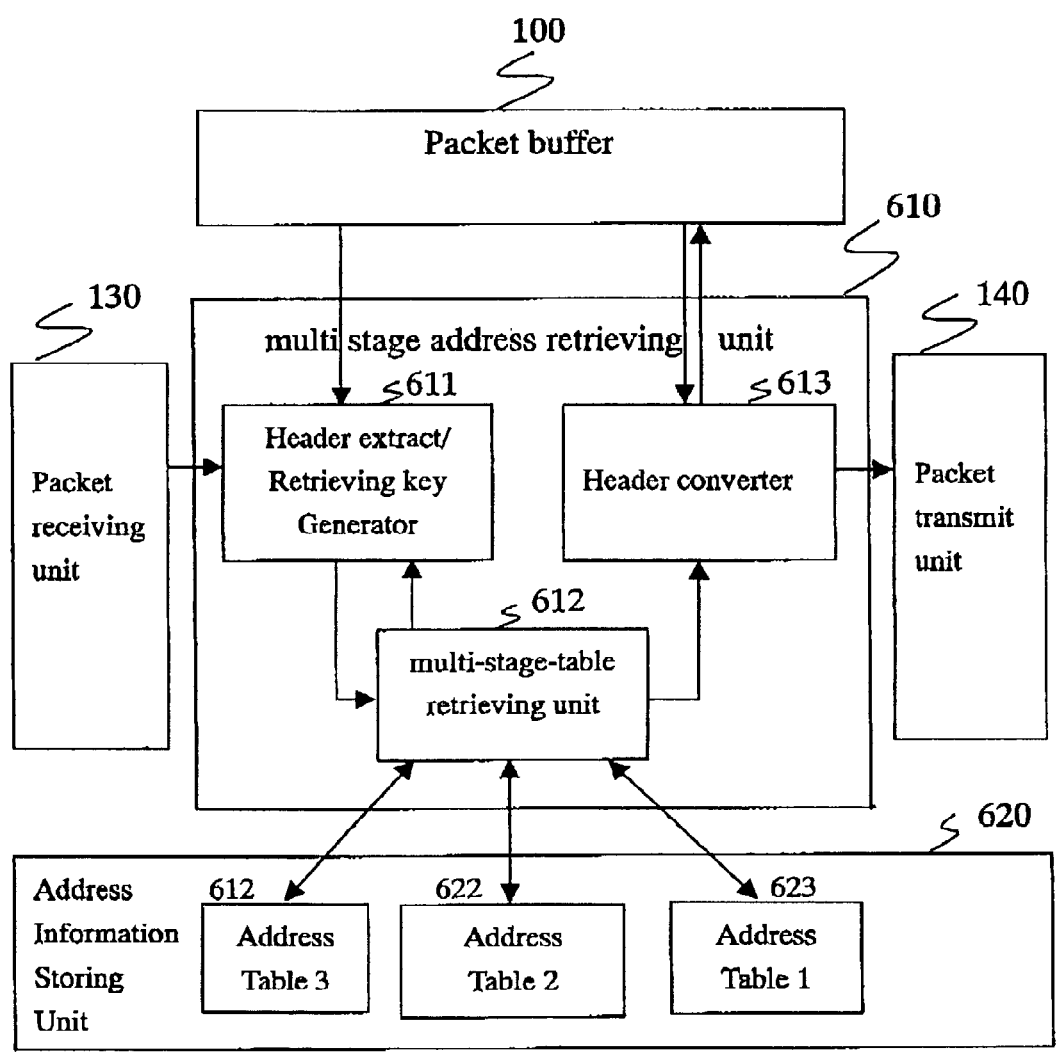
FIG. 8 is a block diagram showing a partial structure of the novel destination retrieving system of FIG. 7.

For every packet header depths and every packet types, one or more destination address information tables are provided. For example, the plurality of destination address information table may be provided for every packet types. A sub-plurality of destination address information table may be provided for each of the packet types, wherein each of the sub-plurality of destination address information table may be provided for each of plural header depths of each packet type. Based on one packet type, a sub-plurality of destination address information table may be selected. In this packet type, one table may be selected or retrieved from the selected sub-plurality of destination address information table by using plural address spaces which are provided for different header depths of the packet. As shown in FIG. 8, the destination address information storage unit 620 may stores three destination address information tables 621, 622, 623 for one packet type and for different three packet header depths. The destination address information table 621 is provided for the one packet type and for a first-level header depth "1" which corresponds to the first stage header. The destination address information table 622 is provided for the same packet type as of the destination address information table 621 and for a second-level header depth "2" which corresponds to the second stage header. The destination address information table 623 is provided for the same packet type as of the destination address information tables 621 622 and for a third-level header depth "3" which corresponds to the third stage header. Each of the destination address information tables 621, 622 and 623 enables the multi-stage destination address retrieving unit 610 to retrieve destination addresses corresponding to the addresses of the external and internal headers as well as retrieve the need to add or delete the external header.

The multi-stage destination address retrieving unit 610 has an internal function-block structure shown in FIG. 8. The multi-stage destination address retrieving unit 610 may include a packet-header-extracting/retrieving-method-deciding unit 611, a multi-stage table-selecting/destination-retrieving unit 612 and a packet header converting unit 613.

The packet-header-extracting/retrieving-method-deciding unit 611 is functionally coupled to the packet receiving unit 130 for receiving a destination address retrieving instruction from the packet receiving unit 130. The packet-header-extracting/retrieving-method-deciding unit 611 is also functionally coupled to the multi-stage table-selecting/destination-retrieving unit 612 for receiving an internal header extracting request from the multi-stage table-selecting/destination-retrieving unit 612. The packet-header-extracting/retrieving-method-deciding unit 611 is also functionally coupled to the packet buffer 100 for extracting an external packet header from the packet stored in the packet buffer 100 in accordance with the destination address retrieving instruction from the packet receiving unit 130 and also extracting an internal packet header from the packet stored in the packet buffer 100 in accordance with the internal header extracting request and a packet header depth information from the multi-stage table-selecting/destination-retrieving unit 612. The internal header is capsuled by an external header. The external header has a shallowest level in header depth.

The packet-header-extracting/retrieving-method-deciding unit 611 decides a packet type from the packet header extracted from the packet stored in the packet buffer 100 in accordance with the destination address retrieving instruction from the packet receiving unit 130. Thereafter, the packet-header-extracting/retrieving-method-deciding unit 611 sends a packet type information, either a packet header depth information or a packet header stage number information, and one or more retrieval keys together with a retrieving instruction to the multi-stage table-selecting/destination-retrieving unit 612.

When the packet-header-extracting/retrieving-method-deciding unit 611 receives the internal header extracting request together with a packet header depth information from the multi-stage table-selecting/destination-retrieving unit 612, then the packet-header-extracting/retrieving-method-deciding unit 611 extracts an internal packet header from the packet stored in the packet buffer 100 in accordance with the internal header extracting request and a packet header depth information from the multi-stage table-selecting/destination-retrieving unit 612, wherein the extracted internal packet header has a depth designated by the received packet header depth information. Thereafter, the packet-header-extracting/retrieving-method-deciding unit 611 sends the packet header depth information and one or more retrieval keys together with another retrieving instruction to the multi-stage table-selecting/destination-retrieving unit 612.

The multi-stage table-selecting/destination-retrieving unit 612 is functionally coupled to the destination address information storage unit 620, which stores a plurality of destination address information table for every packet types, wherein a sub-plurality of destination address information table is provided for each of the packet types. Each of the sub-plurality of destination address information table is provided for each of plural header depths of each packet type. Based on one packet type, a sub-plurality of destination address information table is selected. In this packet type, one table is selected or retrieved from the selected sub-plurality of destination address information table by using plural address spaces which are provided for different header depths of the packet.

Based on both the received informations about the packet type and the header depth, the multi-stage table-selecting/destination-retrieving unit 612 selects a corresponding destination address information table from plural destination address information tables 612, 622 and 623 stored in the destination address information storage unit 620. Based on the received one or more retrieval keys, the multi-stage table-selecting/destination-retrieving unit 612 performs retrieval of the selected destination address information table. The multi-stage table-selecting/destination-retrieving unit 612 also receives returned values from the selected destination address information table. The returned values may include an internal-header-process-designating flag value or an external-header-adding flag value.

The internal-header-process-designating flag value indicates the need to perform internal header processes which means a series of processes for the internal header, for example, an internal header extracting process, a packet type deciding process based on the internal header, and a retrieval process from the table based on retrieval keys from the internal header. If the internal-header-process-designating flag value indicates the need to perform the internal header processes, then this means that the packet includes any internal header. Namely, the multi-stage table-selecting/destination-retrieving unit 612 decides whether or not the packet includes any internal header, based on the internal-header-process-designating flag value included in the returned values from the selected destination address information table. If the multi-stage table-selecting/destination-retrieving unit 612 decides the need to perform the internal header processes, then the multi-stage table-selecting/destination-retrieving unit 612 sends an internal header extracting instruction to the packet header converting unit 613. In addition, the multi-stage table-selecting/destination-retrieving unit 612 sends the internal header extracting request together with a header depth information to the packet-header-extracting/retrieving-method-deciding unit 611, so that the packet-header-extracting/retrieving-method-deciding unit 611 receives the internal header extracting request and the header depth information, and extracts an internal header from the packet stored in the packet header 100 based on the header depth information, wherein the extracted internal header has a header depth designated by the received header depth information. The packet-header-extracting/retrieving-method-deciding unit 611 sends the extracted internal header together with the above header depth information, the packet type and the retrieval keys to the multi-stage table-selecting/destination-retrieving unit 612.

Based on both the received informations about the packet type and the header depth, the multi-stage table-selecting/destination-retrieving unit 612 selects a corresponding destination address information table from plural destination address information tables 612, 622 and 623 stored in the destination address information storage unit 620. Based on the received one or more retrieval keys, the multi-stage table-selecting/destination-retrieving unit 612 performs retrieval of the selected destination address information table. The multi-stage table-selecting/destination-retrieving unit 612 also receives returned values from the selected destination address information table.

The above processes will be repeated until the multi-stage table-selecting/destination-retrieving unit 612 decides no need to perform any further internal header processes, based on the returned process.

After the multi-stage table-selecting/destination-retrieving unit 612 decided no need to perform any further internal header processes based on the last-received returned value from the last-selected or retrieved destination address information table, then the multi-stage table-selecting/destination-retrieving unit 612 decides whether or not it is necessary to add an external header to the packet with reference to the external-header-adding flag value included in the returned value. If the multi-stage table-selecting/destination-retrieving unit 612 decides the need to add a new external header which is to capsule the currently existent most-external header of the packet, based on the external-header-adding flag value, then the multi-stage table-selecting/destination-retrieving unit 612 sends the packet header converting unit 613 an external header adding instruction together with an external header information of the new external header which is to capsule the currently existent most-external header.

If the multi-stage table-selecting/destination-retrieving unit 612 decides no need to add any external header to the packet based on the external-header-adding flag value, then the multi-stage table-selecting/destination-retrieving unit 612 sends the packet header converting unit 613 the retrieval result including the destination information.

The packet header converting unit 613 is functionally coupled to both the packet buffer 100 and the multi-stage table-selecting/destination-retrieving unit 612 for receiving the retrieved destination address or either one of the external header deleting instruction and the external header adding instruction as well as the header and the packet type from the multi-stage table-selecting/destination-retrieving unit 612. The packet header converting unit 613 is capable of deleting the external header from the packet in accordance with the external header deleting instruction received from the multi-stage table-selecting/destination-retrieving unit 612. The packet header converting unit 613 is also capable of adding the external header to the packet in accordance with the external header adding instruction received from the multi-stage table-selecting/destination-retrieving unit 612. The packet header converting unit 613 is also functionally coupled to the packet transmitting unit 140 for sending a packet transmission instruction to the packet transmitting unit 140.

As described above, the destination address information storage unit 620 is functionally coupled to the multi-stage destination address retrieving unit 610. The destination address information storage unit 620 may store a plurality of destination address information table, wherein for every packet header depths and every packet types, one or more destination address information tables are provided. For example, the plurality of destination address information table may be provided for every packet types. A sub-plurality of destination address information table may be provided for each of the packet types, wherein each of the sub-plurality of destination address information table may be provided for each of plural header depths of each packet type. Based on one packet type, a sub-plurality of destination address information table may be selected. In this packet type, one table may be selected or retrieved from the selected sub-plurality of destination address information table by using plural address spaces which are provided for different header depths of the packet. As shown in FIG. 8, the destination address information storage unit 620 may stores three destination address information tables 621, 622, 623 for one packet type and for different three packet header depths. The destination address information table 621 is provided for the one packet type and for a first-level header depth "1" which corresponds to the first stage header. The destination address information table 622 is provided for the same packet type as of the destination address information table 621 and for a second-level header depth "2" which corresponds to the second stage header. The destination address information table 623 is provided for the same packet type as of the destination address information tables 621 622 and for a third-level header depth "3" which corresponds to the third stage header. Each of the destination address information tables 621, 622 and 623 enables the multi-stage table-selecting/destination-retrieving unit 612 to retrieve destination addresses corresponding to the addresses of the external and internal headers as well as retrieve the need to add or delete the external header.

The retrieving keys available to the multi-stage table-selecting/destination-retrieving unit 612 may include, but not limited to, header address informations. As described above, upon retrieval to the destination address tables of the destination address information storage unit 620, the multi-stage table-selecting/destination-retrieving unit 612 receives the above-described returned values which may include, but not limited to, destination informations such as a destination route and a destination MTU, header processing informations such as header renewal informations, internal header processing flags, external header added flags and additional external header informations.

Figure 9:
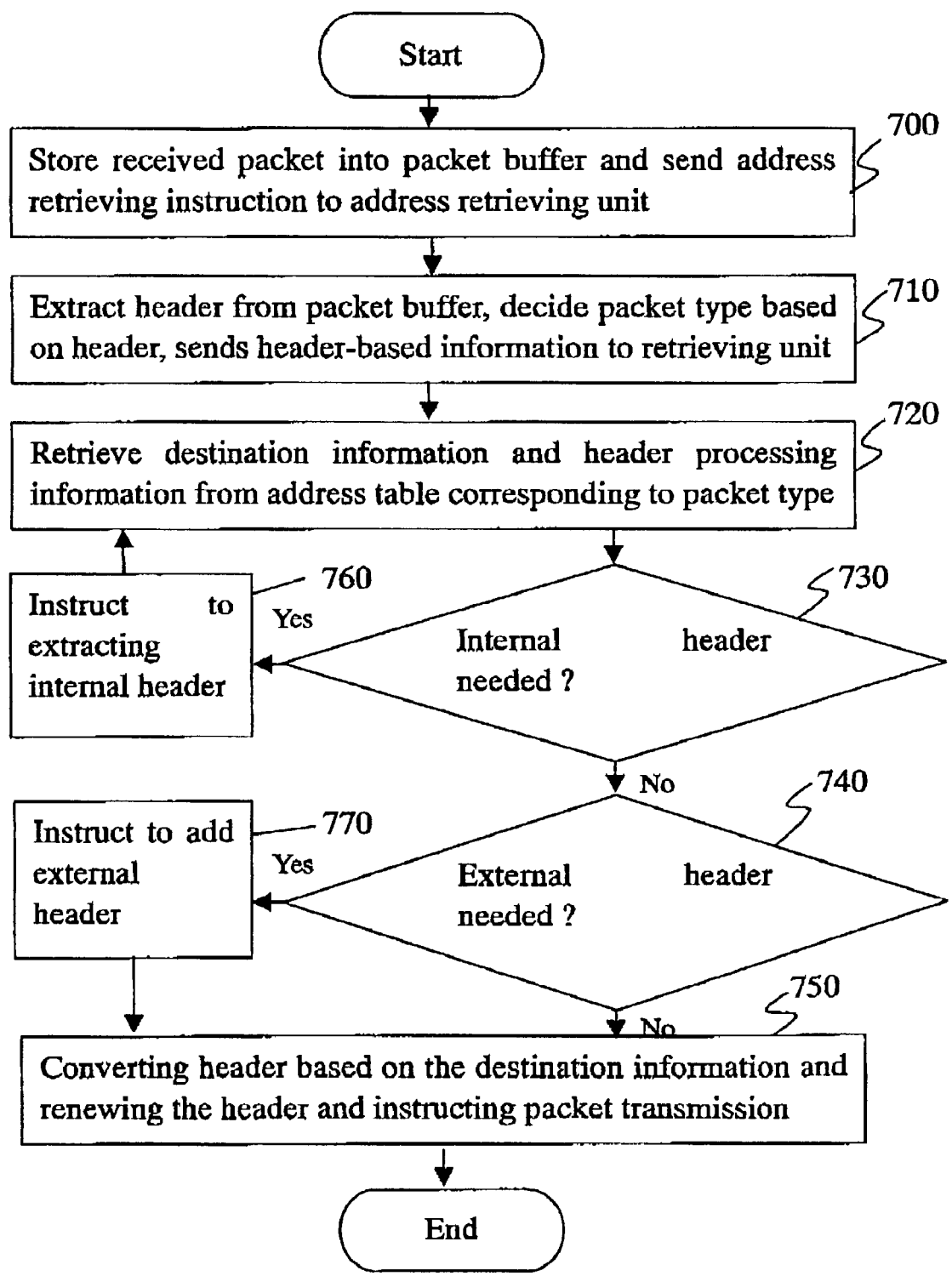
FIG. 9 is a flow chart showing operations of the novel destination retrieving system of FIG. 7.

Operations of the above-described novel destination retrieving system of FIGS. 7 and 8 will subsequently be described with reference to FIG. 9.

In step 700, the packet receiving unit 130 receives, from the packet switch, a destination-undecided packet, for which a decision to a destination address has not yet been made but the decision is needed for transmitting the packet. The packet receiving unit 130 transfers the received destination-undecided packet to the packet buffer 100. The packet buffer 100 stores the packet received by the packet receiving unit 130. The packet receiving unit 130 further sends a destination address retrieving instruction to the packet-header-extracting/retrieving-method-deciding unit 611.

In step 710, the packet-header-extracting/retrieving-method-deciding unit 611 receives a destination address retrieving instruction from the packet receiving unit 130 and also receives an internal header extracting request from the multi-stage table-selecting/destination-retrieving unit 612. The packet-header-extracting/retrieving-method-deciding unit 611 extracts an external packet header from the packet stored in the packet buffer 100 in accordance with the destination address retrieving instruction from the packet receiving unit 130 and also extracts an internal packet header from the packet stored in the packet buffer 100 in accordance with the internal header extracting request. The packet-header-extracting/retrieving-method-deciding unit 611 decides a packet type from the packet header extracted from the packet stored in the packet buffer 100. Thereafter, the packet-header-extracting/retrieving-method-deciding unit 611 sends a packet type information, either a packet header depth information or a packet header stage number information, and one or more retrieval keys together with a retrieving instruction to the multi-stage table-selecting/destination-retrieving unit 612. In the initial time, the packet header depth is set "1" to designate the first level header depth which corresponds to the external header.

In step 720, based on both the received informations about the packet type and the header depth, the multi-stage table-selecting/destination-retrieving unit 612 selects a corresponding destination address information table from plural destination address information tables 612, 622 and 623 stored in the destination address information storage unit 620. Based on the received one or more retrieval keys, the multi-stage table-selecting/destination-retrieving unit 612 performs retrieval of the selected destination address information table and receives returned values from the selected destination address information table. The returned values may include an internal-header-process-designating flag value or an external-header-adding flag value. The internal-header-process-designating flag value indicates the need to perform internal header processes which means a series of processes for the internal header, for example, an internal header extracting process, a packet type deciding process based on the internal header, and a retrieval process from the table based on retrieval keys from the internal header.

In step 730, the multi-stage table-selecting/destination-retrieving unit 612 decides whether need to process the internal header or not, based on the internal-header-process-designating flag value. If the internal-header-process-designating flag value indicates the need to perform the internal header processes, then this means that the packet includes any internal header. Namely, the multi-stage table-selecting/destination-retrieving unit 612 decides whether or not the packet includes any internal header, based on the internal-header-process-designating flag value included in the returned values from the selected destination address information table. For example, the each stage header information includes an information like that each header is the final stage header which indicates the external header or the non-final stage header which indicates the internal header. If the information indicates the final stage header, then this means no need to process the internal header. If the information indicates the non-final stage header, then this means the need to process the internal header.

In step 760, if the multi-stage table-selecting/destination-retrieving unit 612 decides the need to perform the internal header processes, then the multi-stage table-selecting/destination-retrieving unit 612 sends an internal header extracting instruction together with an incremented new header depth "2" to the packet header converting unit 613, wherein the incremented new header depth "2", which indicates the internal header, is created by increment by one to the original or initial header depth "1" which indicates the external header.

In step 720, based on both the received informations about the packet type and the new header depth "2", the multi-stage table-selecting/destination-retrieving unit 612 further selects a new corresponding destination address information table from plural destination address information tables 612, 622 and 623 stored in the destination address information storage unit 620. Based on the received one or more retrieval keys, the multi-stage table-selecting/destination-retrieving unit 612 again performs the retrieval of the newly selected destination address information table and receives new returned values from the newly selected destination address information table. The new returned values may include a new internal-header-process-designating flag value or a new external-header-adding flag value.

In step 730, the multi-stage table-selecting/destination-retrieving unit 612 further decides whether need to process the internal header or not, based on the new internal-header-process-designating flag value. If the new internal-header-process-designating flag value indicates the need to perform the internal header processes, then this means that the packet includes any further internal header. Namely, the multi-stage table-selecting/destination-retrieving unit 612 decides whether or not the packet includes any further internal header, based on the new internal-header-process-designating flag value included in the new returned values from the newly selected destination address information table.

In step 760, if the multi-stage table-selecting/destination-retrieving unit 612 decides the need to perform a further internal header processes, then the multi-stage table-selecting/destination-retrieving unit 612 sends a further internal header extracting instruction together with a further incremented header depth "3" to the packet header converting unit 613, wherein the incremented header depth "3", which indicates the further internal header which is capsuled by the internal header adjust to the original external header, is created by increment by one to the last incremented header depth "2" which indicates the internal header.

The above steps 710, 720, 730 and 760 will be repeated for all of the headers of the subject packet.

In step 730, after the multi-stage table-selecting/destination-retrieving unit 612 decided no need to perform any further internal header processes based on the last-received returned value from the last-selected or retrieved destination address information table, then in step 740, the multi-stage table-selecting/destination-retrieving unit 612 decides whether or not it is necessary to add an external header to the packet with reference to the external-header-adding flag value included in the returned value.

In step 770, if the multi-stage table-selecting/destination-retrieving unit 612 decides the need to add a new external header which is to capsule the currently existent most-external header of the packet, based on the external-header-adding flag value, then the multi-stage table-selecting/destination-retrieving unit 612 sends the packet header converting unit 613 an external header adding instruction together with an external header information of the new external header which is to capsule the currently existent most-external header.

In step 750, the packet header converting unit 613 performs addition of the external header, the header switch in accordance with the destination, for example, adding a lower-level header for destination, and a header renewal process, for example, a subtraction of the loop-protection counter and an associated checksum renewal, so that the packet header converting unit 613 sends a packet transmission instruction to the packet transmitting unit 140.

In step 740, if the multi-stage table-selecting/destination-retrieving unit 612 decides no need to add any external header to the packet based on the external-header-adding flag value, then the multi-stage table-selecting/destination-retrieving unit 612 sends the packet header converting unit 613 the retrieval result including the destination information and if any the external header deleting request.

In step 750, the packet header converting unit 613 re-writes the header of the packet and sends the packet transmitting unit 140 the packet transmitting instruction.

As described above, in accordance with the destination retrieving system and method of the first embodiment of the present invention, the multi-stage destination address retrieving unit 610 includes the packet-header-extracting/retrieving-method-deciding unit 611, the multi-stage table-selecting/destination-retrieving unit 612 and the packet header converting unit 613. The packet-header-extracting/retrieving-method-deciding unit 611 generates one or more retrieval keys from the header informations of the packet stored in the packet buffer 100, in response to the address retrieval instruction from the packet receiving unit 130, and also generates one or more retrieval keys from the internal header informations of the packet stored in the packet buffer 100, in response to the internal header extracting request from the multi-stage table-selecting/destination-retrieving unit 612. The multi-stage table-selecting/destination-retrieving unit 612 retrieves the address information tables in the destination address information storage unit 620 based on the one or more retrieval keys and receives the returned values which indicate whether or not the packet has an internal header. If the packet has an internal header, then the multi-stage table-selecting/destination-retrieving unit 612 sends the internal header extracting instruction to the packet-header-extracting/retrieving-method-deciding unit 611.

If the packet receiving unit 130 receives the packet having plural headers, then the multi-stage destination address retrieving unit 610 performs the process for retrieval of the destination. No process for the packet by the CPU is needed. For this reason, the system and method realizes a desired high speed packet transmitting process.

Figure 10:
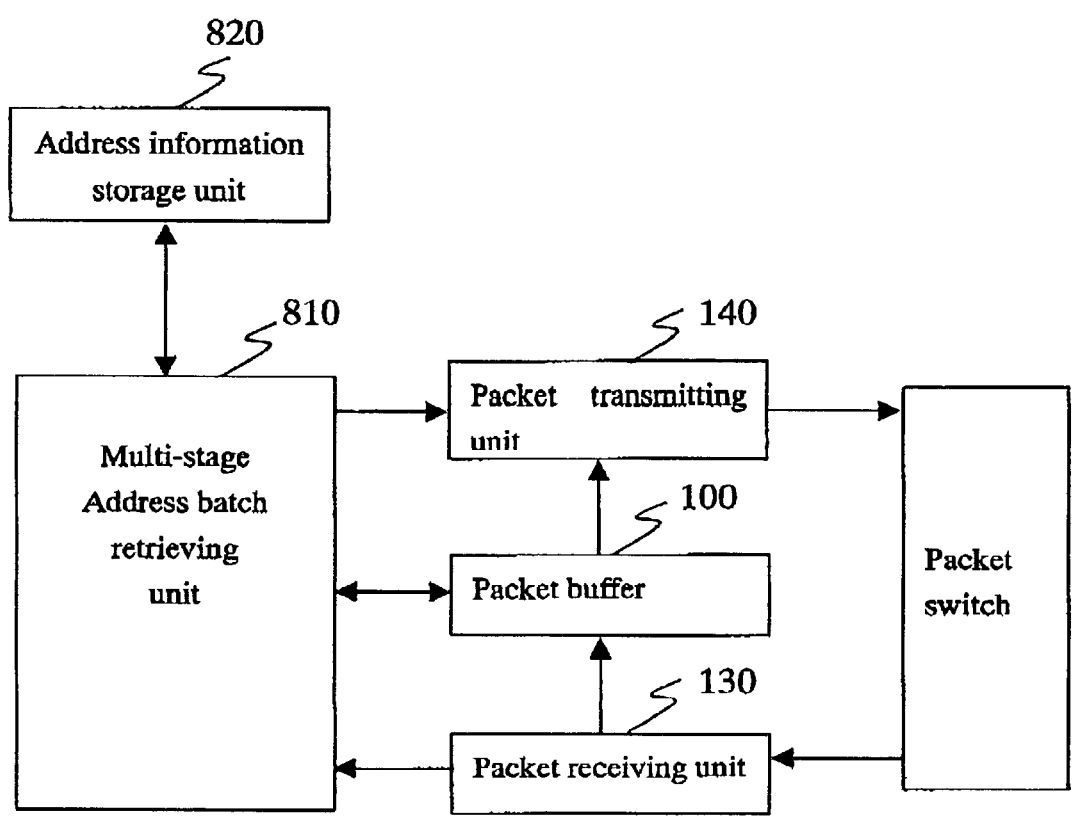
FIG. 10 is a block diagram showing a novel destination retrieving system in accordance with the second embodiment of the present invention.

Second Embodiment:

A second embodiment according to the present invention will be described in detail with reference to the drawings. In accordance with the second embodiment of the present invention, a destination retrieving system will, hereinafter, be described with reference to the drawings. FIG. 10 shows a novel destination retrieving system in accordance with the second embodiment of the present invention. The novel destination retrieving system includes a packet buffer 100, a multi-stage destination address batch-retrieving unit 810, a destination address information storage unit 820, a packet receiving unit 130 and a packet transmitting unit 140.

The packet receiving unit 130 receives, from the packet switch, a destination-undecided packet, for which a decision to a destination address has not yet been made but the decision is needed for transmitting the packet. The packet buffer 100 is functionally coupled to the packet receiving unit 130 for receiving the packet from the packet receiving unit 130 and storing the packet therein. The packet buffer 100 comprises a storage unit for storing the packet received by the packet receiving unit 130.

The packet transmitting unit 140 is functionally coupled to the packet buffer 100 for receiving the packet from the packet buffer 100. The packet transmitting unit 140 is capable of transmitting, to the packet switch, a destination-decided packet, for which a decision of the destination address for transmission has already been made.

The multi-stage destination address batch-retrieving unit 810 is functionally coupled to the packet buffer 100 for making a decision of a destination address of the destination-undecided packet stored in the packet buffer 100. The multi-stage destination address batch-retrieving unit 810 is further functionally coupled to the packet receiving unit 130 and also to the packet transmitting unit 140. The multi-stage destination address batch-retrieving unit 810 may be realized by a hardware. The destination address information storage unit 820 is functionally coupled to the multi-stage destination address batch-retrieving unit 810. The destination address information storage unit 820 may, for example, comprise a content addressable memory. The destination address information storage unit 820 may store a plurality of multi-stage destination address information table which enables the multi-stage destination address batch-retrieving unit 810 to batch-retrieve destination addresses for the destination-undecided packet stored in the packet buffer 100 based on the destination address information tables.

Figure 11:
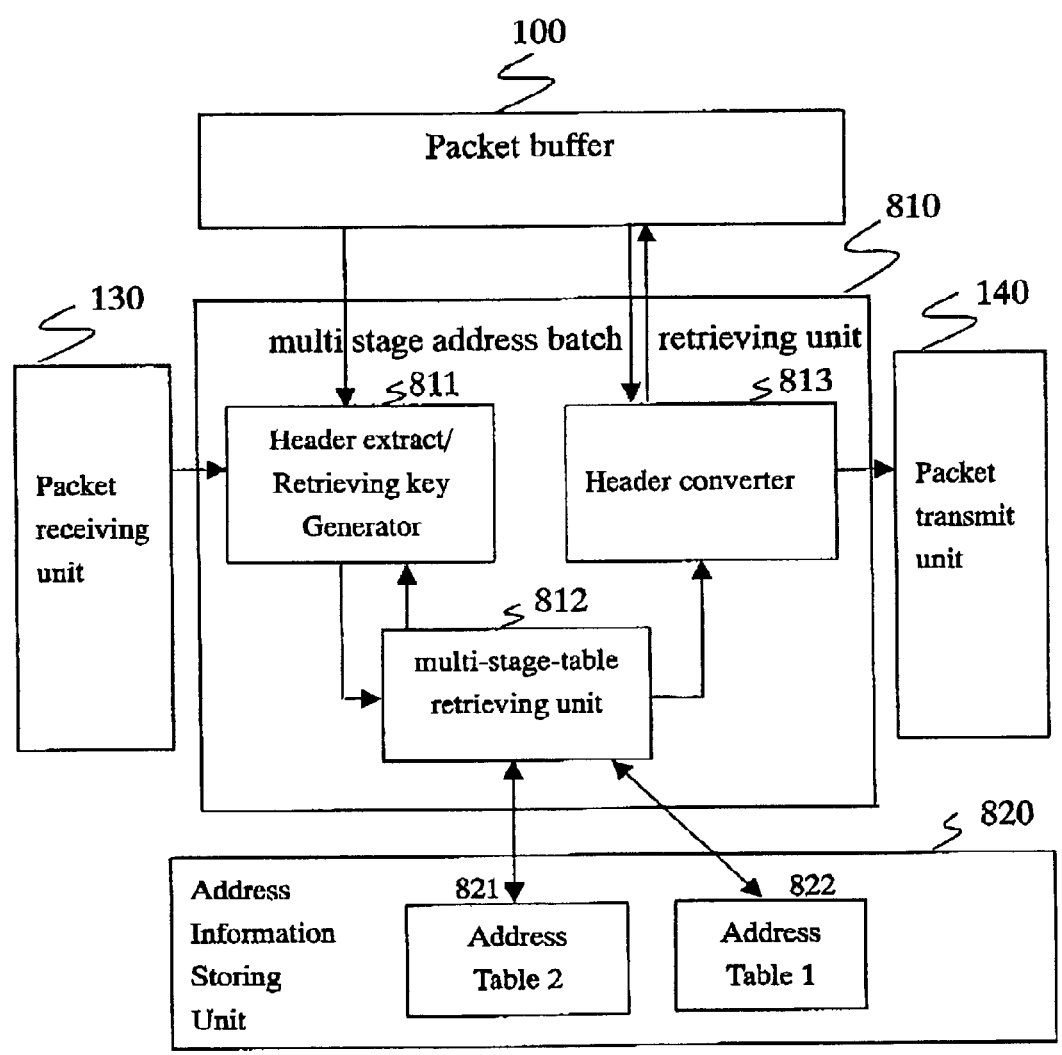
FIG. 11 is a block diagram showing a partial structure of the novel destination retrieving system of FIG. 10.

The multi-stage destination address batch-retrieving unit 810 has an internal function-block structure shown in FIG. 11. The multi-stage destination address batch-retrieving unit 810 may include a multi-stage-header-extracting/retrieving-method-deciding unit 811, a multi-stage table-selecting/destination-batch-retrieving unit 812 and a packet header converting unit 813.

The multi-stage-header-extracting/retrieving-method-deciding unit 811 is functionally coupled to the packet receiving unit 130 for receiving a destination address retrieving instruction from the packet receiving unit 130. The multi-stage-header-extracting/retrieving-method-deciding unit 811 is also functionally coupled to the multi-stage table-selecting/destination-batch-retrieving unit 812. The multi-stage-header-extracting/retrieving-method-deciding unit 811 is also functionally coupled to the packet buffer 100 for batch-extracting plural headers with different depths from the packet stored in the packet buffer 100 in accordance with the destination address retrieving instruction from the packet receiving unit 130. The number of the plural headers to be batch-extracted may be predetermined.

The multi-stage table-selecting/destination-batch-retrieving unit 812 is functionally coupled to the destination address information storage unit 820, which stores a plurality of multi-stage destination address information table.

Based on both the received informations about the packet type and the header depth, the multi-stage table-selecting/destination-batch-retrieving unit 812 selects a corresponding multi-stage destination address information table from plural multi-stage destination address information tables 812 and 822 stored in the destination address information storage unit 820. Based on the received one or more retrieval keys, the multistage table-selecting/destination-batch-retrieving unit 812 performs batch-retrieval of the selected multi-stage destination address information table. The multi-stage table-selecting/destination-batch-retrieving unit 812 also receives returned values from the selected multi-stage destination address information table. The returned values may include an internal-header-process-designating flag value or an external-header-adding flag value. The multi-stage table-selecting/destination-batch-retrieving unit 812 sends the packet header converting unit 813 the retrieval result including the destination information.

The packet header converting unit 813 is functionally coupled to both the packet buffer 100 and the multi-stage table-selecting/destination-batch-retrieving unit 812 for receiving the retrieved destination address or either one of the external header deleting instruction and the external header adding instruction as well as the header and the packet type from the multi-stage table-selecting/destination-batch-retrieving unit 812. The packet header converting unit 813 is capable of deleting the external header from the packet in accordance with the external header deleting instruction received from the multi-stage table-selecting/destination-batch-retrieving unit 812. The packet header converting unit 813 is also capable of adding the external header to the packet in accordance with the external header adding instruction received from the multi-stage table-selecting/destination-batch-retrieving unit 812. The packet header converting unit 813 is also functionally coupled to the packet transmitting unit 140 for sending a packet transmission instruction to the packet transmitting unit 140.

As described above, the destination address information storage unit 820 is functionally coupled to the multi-stage destination address batch-retrieving unit 810. The destination address information storage unit 820 may store a plurality of multi-stage destination address information table for every packet types. The each multi-stage destination address information table 821 or 822 for the multi-stage headers of different depths of the same packet type enables retrievals of the destinations to the addresses of the external and internal headers, and the need to add or delete the external header based on the retrieval keys of the plural stage headers.

FIG. 12 is a view of address retrieval entries stored in each multi-stage destination address information table stored in the destination address information storage unit shown in FIG. 11. The multi-stage table-selecting/destination-batch-retrieving unit 812 uses batch-extracted addresses of the headers on the plural stages as the retrieval keys, to decide a longest entry in the entries shown in FIG. 12.

The batch-processes based on the headers on the plural stages are different from the first embodiment. Namely, independent from the packet headers on the plural stages, the multi-stage-header-extracting/retrieving-method-deciding unit 811 batch-extracts the data of a predetermined header length which corresponds to predetermined plural stages from the packet stored in the packet buffer 100, and sends the multi-stage table-selecting/destination-batch-retrieving unit 812 the plural stage headers as the retrieval keys with the packet type. The multi-stage table-selecting/destination-batch-retrieving unit 812 performs the retrievals based on the plural stage headers as the retrieval keys and sends the packet header converting unit 813 the instruction to add or delete the external header and any additional external header data. The process by the packet header converting unit 813 is the same as in the first embodiment.

Figure 13:
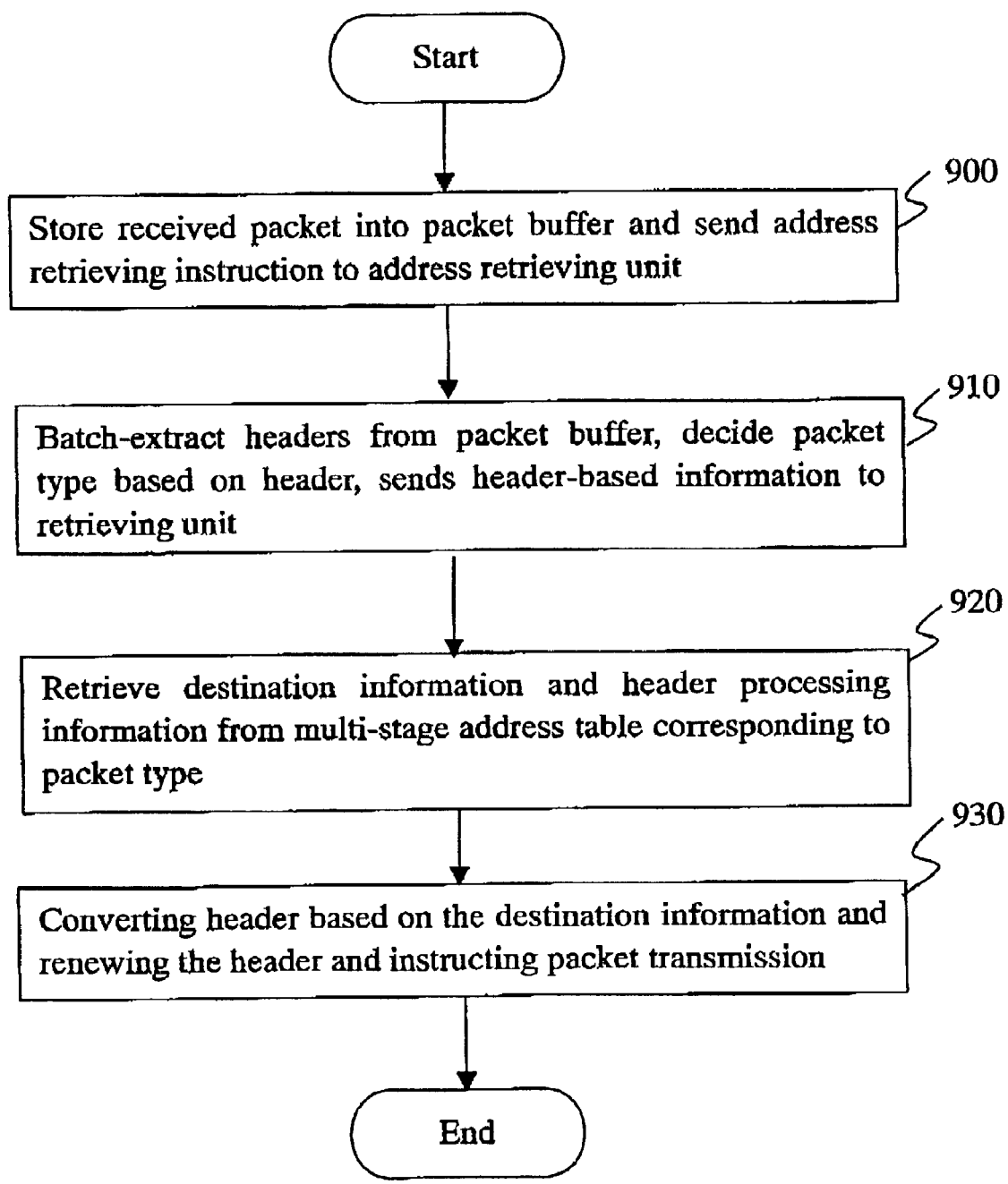
FIG. 13 is a flow chart showing operations of the novel destination retrieving system of FIG. 10.

Operations of the above-described novel destination retrieving system of FIGS. 10, 11 and 12 will subsequently be described with reference to FIG. 13.

In step 900, the packet receiving unit 130 receives, from the packet switch, a destination-undecided packet, for which a decision to a destination address has not yet been made but the decision is needed for transmitting the packet. The packet receiving unit 130 transfers the received destination-undecided packet to the packet buffer 100. The packet buffer 100 stores the packet received by the packet receiving unit 130. The packet receiving unit 130 further sends a destination address retrieving instruction to the multi-stage-header-extracting/retrieving-method-deciding unit 811.

In step 910, the multi-stage-header-extracting/retrieving-method-deciding unit 811 receives a destination address retrieving instruction from the packet receiving unit 130. Independent from the presence or absence of the packet headers on the plural stages, the multi-stage-header-extracting/retrieving-method-deciding unit 811 batch-extracts plural headers of plural stages, which corresponds to a predetermined bit number, from the packet stored in the packet buffer 100 in accordance with the destination address retrieving instruction from the packet receiving unit 130. The multi-stage-header-extracting/retrieving-method-deciding unit 811 decides a packet type from the packet headers extracted from the packet stored in the packet buffer 100. Thereafter, the multi-stage-header-extracting/retrieving-method-deciding unit 811 sends retrieval keys with a packet type information and a retrieving instruction to the multi-stage table-selecting/destination-batch-retrieving unit 812.

In step 920, based on the packet type, the multi-stage table-selecting/destination-batch-retrieving unit 812 selects a corresponding multi-stage destination address information table from plural multi-stage destination address information tables 812 and 822 stored in the destination address information storage unit 820. Based on the received retrieval keys of the plural headers on the plural stages, the multi-stage table-selecting/destination-batch-retrieving unit 812 performs retrieval of the destination address information and the header processing information, which may include addition or deletion of the external address and any additional external header data, from the selected multi-stage destination address information table. The addresses of the headers, which have been batch-extracted, are used as the retrieval keys. A longest one of the address retrieval entries shown in FIG. 12 is decided to be the effective entry. After the above retrieval process, the multi-stage table-selecting/destination-batch-retrieving unit 812 receives returned values from the selected multi-stage destination address information table. The returned values may include an internal-header-process-designating flag value or an external-header-adding flag value. The multi-stage table-selecting/destination-batch-retrieving unit 812 sends the packet header converting unit 813 the header-rewriting information about adding or deleting the external header.

In step 930, the packet header converting unit 813 performs the header-rewrite process and sends the packet transmitting instruction to the packet transmitting unit 140.

As described above, in accordance with the present invention, the multi-stage destination address retrieving unit 610 includes the multi-stage-header-extracting/retrieving-method-deciding unit 811 which batch-extracts the header data which correspond to the headers on the multi-stages and the multi-stage table-selecting/destination-batch-retrieving unit 812 which performs retrieval to the multi-stage address information tables 821 and 822 stored in the address information storage unit 820 by use of the header data extracted.

If the packet receiving unit 130 receives the packet having plural headers, then the multi-stage destination address retrieving unit 810 performs the process for retrieval of the destination. No process for the packet by the CPU is needed. For this reason, the system and method realizes a desired high speed packet transmitting process.

Figure 14:
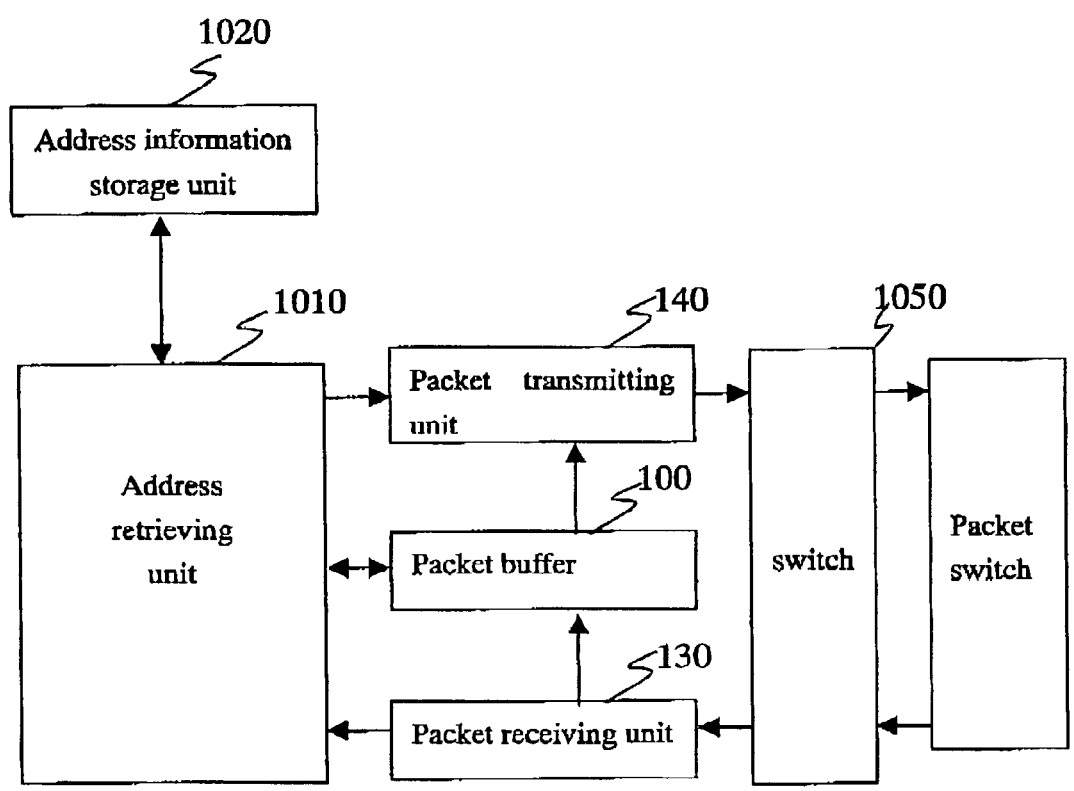
FIG. 14 is a block diagram showing a novel destination retrieving system in accordance with the third embodiment of the present invention.

Third Embodiment:

A third embodiment according to the present invention will be described in detail with reference to the drawings. In accordance with the third embodiment of the present invention, a destination retrieving system will, hereinafter, be described with reference to the drawings. FIG. 14 shows a novel destination retrieving system in accordance with the third embodiment of the present invention. The novel destination retrieving system includes a packet buffer 100, a feedback destination address retrieving unit 1010, a destination address information storage unit 1020, a packet receiving unit 130, a packet transmitting unit 140 and a switch 1050.

The packet receiving unit 130 receives, through the switch 1050 from the packet switch, a destination-undecided packet, for which a decision to a destination address has not yet been made but the decision is needed for transmitting the packet. The packet buffer 100 is functionally coupled to the packet receiving unit 130 for receiving the packet from the packet receiving unit 130 and storing the packet therein. The packet buffer 100 comprises a storage unit for storing the packet received by the packet receiving unit 130.

The packet transmitting unit 140 is functionally coupled to the switch 1050 for transmitting the packet through the switch 1050 to the packet switch. The switch 1050 is interposed between the packet switch and both the packet receiving unit 130 and the packet transmitting unit 140, so that the packet transmitting unit 140 transmits, through the switch 1050 to the packet switch, a destination-decided packet, for which a decision of the destination address for transmission has already been made.

Figure 15:
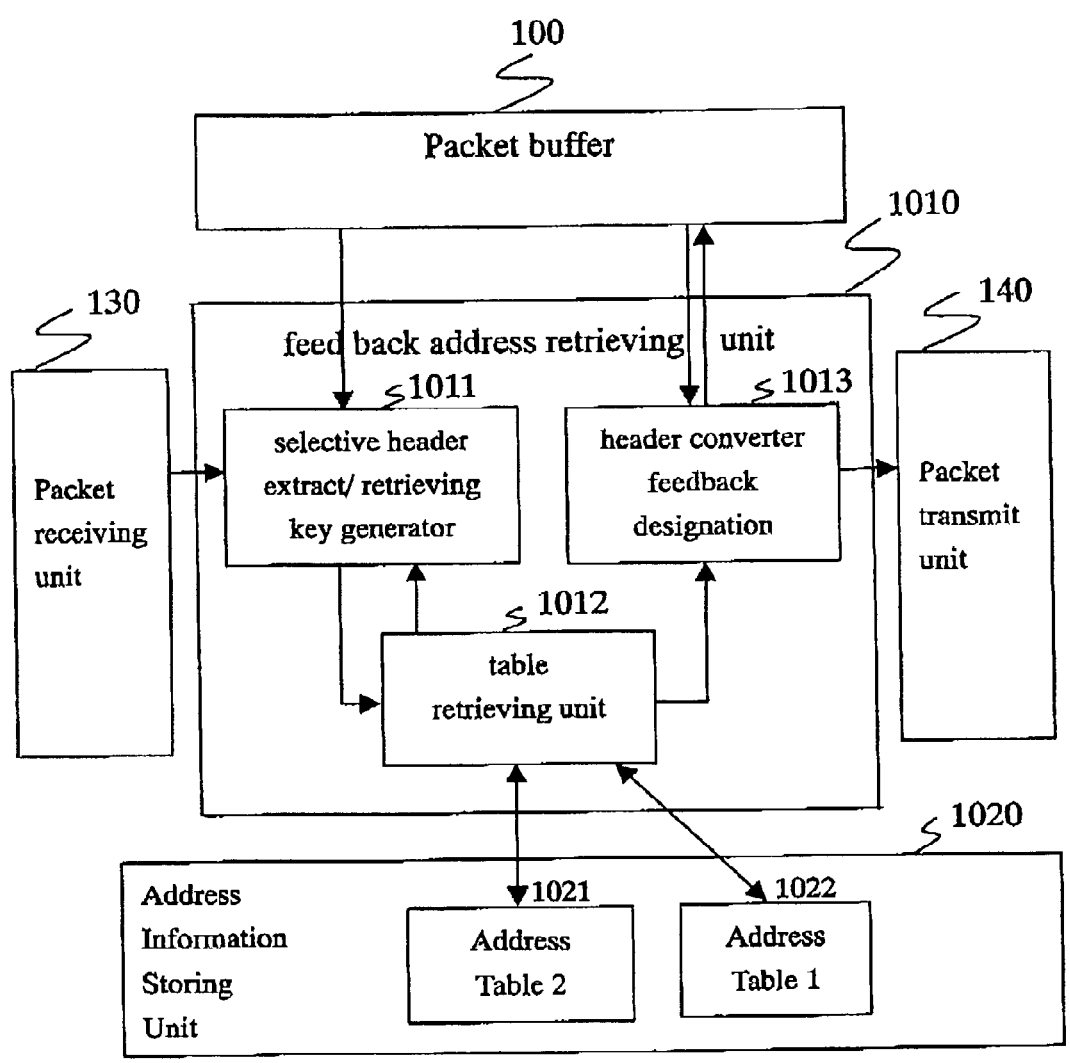
FIG. 15 is a block diagram showing a partial structure of the novel destination retrieving system of FIG. 14.

The feedback destination address retrieving unit 1010 has an internal function-block structure shown in FIG. 15. The feedback destination address retrieving unit 1010 may include a selective-header-extracting/retrieving-method-deciding unit 1011, a table-retrieving unit 1012 and a packet header converting/feedback-designating unit 1013.

The selective-header-extracting/retrieving-method-deciding unit 1011 is functionally coupled to the packet receiving unit 130 for receiving a destination address retrieving instruction from the packet receiving unit 130. The selective-header-extracting/retrieving-method-deciding unit 1011 is also functionally coupled to the table-retrieving unit 1012. The selective-header-extracting/retrieving-method-deciding unit 1011 is also functionally coupled to the packet buffer 100 for extracting a header from the packet stored in the packet buffer 100 in accordance with the destination address retrieving instruction from the packet receiving unit 130. The selective-header-extracting/retrieving-method-deciding unit 1011 selects the data to be extracted from the packet based on the presence or absence of a designated-stage-header processing instruction flag which designates the stage on which the header to be processed is present. The selective-header-extracting/retrieving-method-deciding unit 1011 generates the retrieval keys from the extracted data of the packet.

The table-retrieving unit 1012 is functionally coupled to the destination address information storage unit 1020, which stores a plurality of multi-stage destination address information table. The table-retrieving unit 1012 performs retrievals of informations about the presence or absence of the internal header, and the need to add or delete the external header from the address information tables 1021 and 1022 stored in the address information storage unit 1020.

The packet header converting/feedback-designating unit 1013 is functionally coupled to both the packet buffer 100 and the table-retrieving unit 1012 for receiving the retrieved destination address or either one of the external header deleting instruction and the external header adding instruction as well as the header and the packet type from the table-retrieving unit 1012. The packet header converting/feedback-designating unit 1013 is capable of deleting the external header from the packet in accordance with the external header deleting instruction received from the table-retrieving unit 1012. The packet header converting/feedback-designating unit 1013 is also capable of adding the external header to the packet in accordance with the external header adding instruction received from the table-retrieving unit 1012. The packet header converting/feedback-designating unit 1013 is also capable of adding the designated-stage-header processing instruction flag to the packet. The packet header converting/feedback-designating unit 1013 is also functionally coupled to the packet transmitting unit 140 for sending a packet transmission instruction and the packet with the designated-stage-header processing instruction flag to the packet transmitting unit 140.

The destination address information storage unit 1020 is functionally coupled to the feedback destination address retrieving unit 1010. The destination address information storage unit 1020 may store a plurality of destination address information table for every packet types. The each multi-stage destination address information table 821 or 822 of the same packet type enables retrievals of the destinations to the addresses of the external and internal headers, and the need to add or delete the external header and the designated-stage-header processing instruction flag based on the retrieval keys of the plural stage headers.

The feedback destination address retrieving unit 1010 includes the selective-header-extracting/retrieving-method-deciding unit 1011, which selects the data to be extracted from the packet based on the presence or absence of a designated-stage-header processing instruction flag which designates the stage on which the header to be processed is present, and the table-retrieving unit 1012, which performs retrievals of informations about the presence or absence of the internal header, and the need to add or delete the external header from the address information tables 1021 and 1022 stored in the address information storage unit 1020, as well as the packet header converting/feedback-designating unit 1013 is also capable of adding the designated-stage-header processing instruction flag to the packet.

Figure 16:
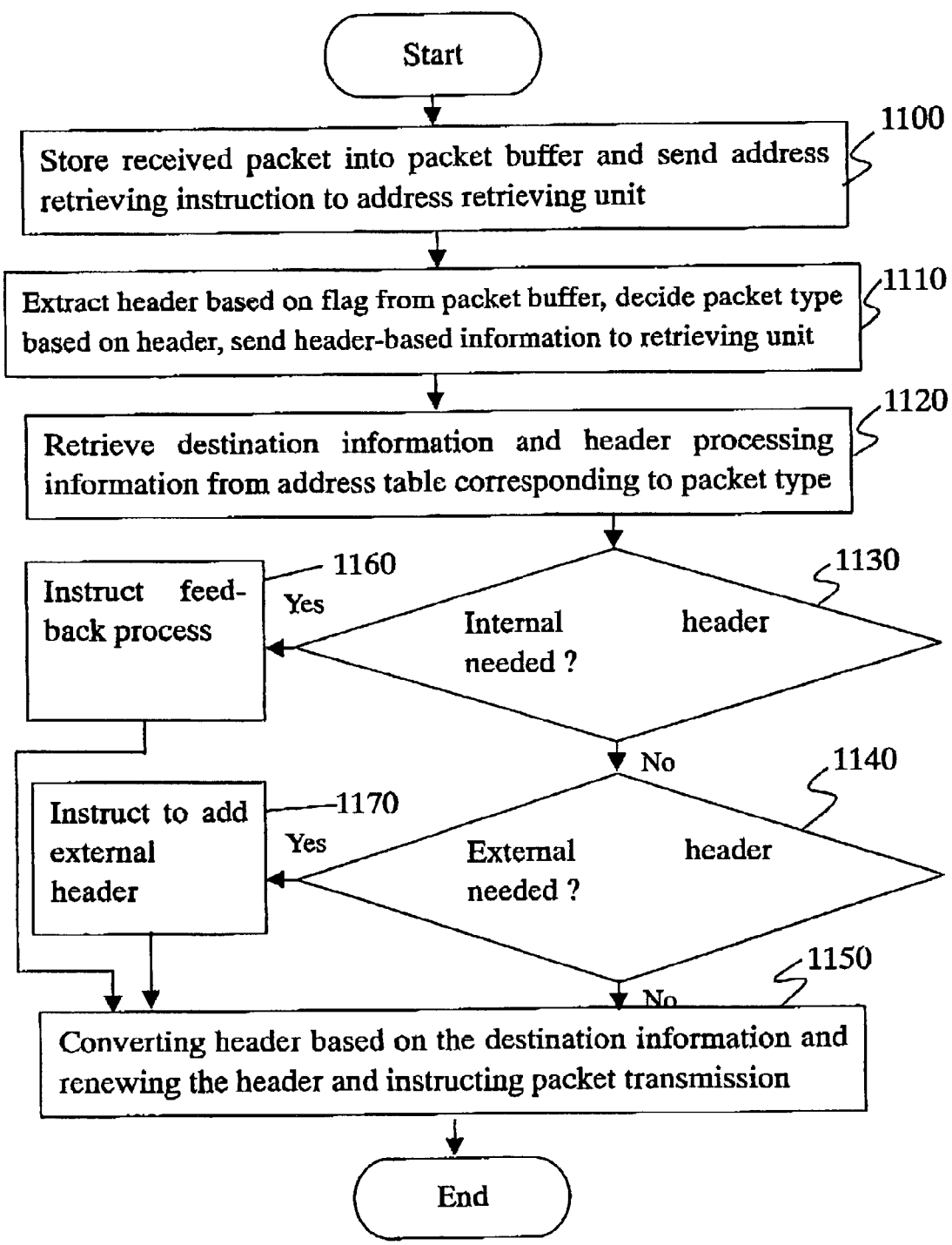
FIG. 16 is a flow chart showing operations of the novel destination retrieving system of FIG. 14.

Operations of the above-described novel destination retrieving system of FIGS. 14 and 15 will subsequently be described with reference to FIG. 16.

In step 1100, the packet receiving unit 130 receives, from the packet switch, a destination-undecided packet, for which a decision to a destination address has not yet been made but the decision is needed for transmitting the packet. The packet receiving unit 130 transfers the received destination-undecided packet to the packet buffer 100. The packet buffer 100 stores the packet received by the packet receiving unit 130. The packet receiving unit 130 further sends a destination address retrieving instruction to the selective-header-extracting/retrieving-method-deciding unit 1011.

In step 1010, the selective-header-extracting/retrieving-method-deciding unit 1011 receives a destination address retrieving instruction from the packet receiving unit 130. The selective-header-extracting/retrieving-method-deciding unit 1011 confirms the presence or absence of the designated-stage-header processing instruction flag which designates the stage on which the header to be processed is present. If the designated-stage-header processing instruction flag is absent, then the selective-header-extracting/retrieving-method-deciding unit 1011 extracts the header on the first stage from the packet buffer 100. If the designated-stage-header processing instruction flag is present, then the selective-header-extracting/retrieving-method-deciding unit 1011 extracts, from the packet buffer 100, the header on the stage designated by the designated-stage-header processing instruction flag. The selective-header-extracting/retrieving-method-deciding unit 1011 decides a packet type from the extracted packet header. The selective-header-extracting/retrieving-method-deciding unit 1011 sends the table-retrieving unit 1012 the retrieval keys and the packet type. The designated-stage-header processing instruction flag is to add a header to each of all the packets and is stored in the header.

In step 1020, based on the packet type, the table-retrieving unit 1012 selects a corresponding destination address information table from plural destination address information tables 1012 and 1022 stored in the destination address information storage unit 1020. Based on the received retrieval keys, the table-retrieving unit 1012 performs retrieval of the destination address information from the selected destination address information table. The table-retrieving unit 1012 receives returned values from the selected multi-stage destination address information table. The returned values may include an internal-header-process-designating flag value which indicates the presence or absence of the instruction to process the internal header.

In step 1030, the table-retrieving unit 1012 decides the internal-header-process-designating flag value to decides the presence or absence of the instruction to process the internal header.

In step 1060, if the instruction to process the internal header is present, then the table-retrieving unit 1012 sends the packet header converting/feedback-designating unit 1013 a feedback process instruction. For decision to process the internal header, the information of the header on each stage includes an information indicating the final stage header to the final stage header and an information indicating the non-final stage header to the other stage header than the final stage header. If the returned value includes the internal header process flag value indicates the non-final stage header, then this means that the process for the internal header is needed. If the returned value does not include the internal header process flag value indicates the non-final stage header, then this means that the process for the internal header is not needed.

In step 1150, the packet header converting/feedback-designating unit 1013 receives the feedback process instruction and adds the designated-stage-header processing instruction flag to the packet before the packet header converting/feedback-designating unit 1013 sends the packet transmitting unit 140 the packet transmutation instruction to transmit the packet to the packet receiving unit 130.

In step 1130, the instruction to process the internal header is absent, then in the step 1140 the table-retrieving unit 1012 decides the external header adding flag value included in the returned value from the address retrieval tables 1021 and 2022 to confirm the need to add the external header.

If the addition of the external header is needed, then in step 1170, the table-retrieving unit 1012 sends the packet header converting/feedback-designating unit 1013 the external header adding instruction.

In step 1150, the packet header converting/feedback-designating unit 1013 receives the external header adding instruction and adds the external header to the packet for rewriting the header of the packet. The packet header converting/feedback-designating unit 1013 sends the packet transmitting unit 140 the packet transmitting instruction.

In step 1140, if the addition of the external header is not needed, then the table-retrieving unit 1012 sends the packet header converting/feedback-designating unit 1013 the retrieval results. In step 1150, the packet header converting/feedback-designating unit 1013 receives the retrieval results and performs the header conversion in accordance with the destination, before transmitting the packet transmitting instruction to the packet transmitting unit 140.

As described above, the feedback destination address retrieving unit 1010 includes the selective-header-extracting/retrieving-method-deciding unit 1011, the table-retrieving unit 1012 and the packet header converting/feedback-designating unit 1013. The selective-header-extracting/retrieving-method-deciding unit 1011 selects the data to be extracted from the packet based on the presence or absence of a designated-stage-header processing instruction flag which designates the stage on which the header to be processed is present. The selective-header-extracting/retrieving-method-deciding unit 1011 generates the retrieval keys from the extracted data of the packet. The table-retrieving unit 1012 performs retrievals of informations about the presence or absence of the internal header, and the need to add or delete the external header from the address information tables 1021 and 1022 stored in the address information storage unit 1020. The packet header converting/feedback-designating unit 1013 is capable of deleting the external header from the packet in accordance with the external header deleting instruction received from the table-retrieving unit 1012. The packet header converting/feedback-designating unit 1013 is also capable of adding the external header to the packet in accordance with the external header adding instruction received from the table-retrieving unit 1012. The packet header converting/feedback-designating unit 1013 is also capable of adding the designated-stage-header processing instruction flag to the packet. The packet header converting/feedback-designating unit 1013 is also functionally coupled to the packet transmitting unit 140 for sending a packet transmission instruction and the packet with the designated-stage-header processing instruction flag to the packet transmitting unit 140.

If the packet receiving unit 130 receives the packet having plural headers, then the feedback destination address retrieving unit 1010 performs the process for retrieval of the destination. No process for the packet by the CPU is needed. For this reason, the system and method realizes a desired high speed packet transmitting process.

If the packet receiving unit 130 receives the packet having a single header, then the feedback destination address retrieving unit 1010 performs the destination address retrieving process without any feedback process, thereby improving the transfer quality of the single-header packet.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A system for retrieving a destination address of a packet, comprising:
   a packet storage unit for storing a packet which has plural-staged headers having respective destination addresses;
   an address information storage unit for storing a plurality of address information table, which stores address informations for each header; and
   an address retrieving unit functionally coupled to said packet storage unit and said address information storage unit,
   wherein said address retrieving unit generates at least one first-retrieval key from an external header information of said packet stored in said packet storage unit,
   said address retrieving unit also performs a first-retrieval to at least one of said plurality of address information table based on said at least one first-retrieval key and receives a first-returned value, which depends upon a first-retrieval result made, from said address information storage unit, said first-returned value indicating the presence or absence of any internal header in said packet,
   if said returned value indicates the presence of any internal header in said packet, then said address retrieving unit further generates at least one second-retrieval key from an internal header information of said packet, so that said address retrieving unit also performs a second-retrieval to at least other one of said plurality of address information table based on said at least one second-retrieval key and receives a second-returned value, which depends upon a second-retrieval result made, from said address information storage unit, said second-returned value indicates the presence or absence of any further internal header in said packet, and
   if said returned value indicates the absence of any internal header in said packet, then said address retrieving unit outputs a retrieval result.

2. The system as claimed in claim 1, wherein said address retrieving unit further comprises:
   a retrieval key generating unit generating at least one first-retrieval key from an external header information of said packet stored in said packet storage unit in accordance with an address retrieval instruction, and said retrieval key generating unit further generating at least one second-retrieval key from an internal header information of said packet; and
   a retrieving unit functionally coupled to said retrieval key generating unit, said retrieving unit performing a first-retrieval to at least one of said plurality of address information table and receiving said first-returned value, which depends upon a retrieval result made, from said address information storage unit, and said retrieving unit also performing said second-retrieval to at least other one of said plurality of address information table based on said at least one second-retrieval key and receives a second-returned value, which depends upon a second-retrieval result made, from said address information storage unit.

3. The system as claimed in claim 2, wherein said address retrieving unit further comprises:
   a header converting unit functionally coupled to said retrieving unit for receiving said retrieval result from said retrieving unit, and said header converting unit rewriting a header of said packet stored in said packet storage unit based on said retrieving result.

4. The system as claimed in claim 1, wherein said address retrieving unit comprises a hardware.

5. A system for retrieving a destination address of a packet, comprising:
   a packet storage unit for storing a packet which has plural-staged headers having respective destination addresses;
   an address information storage unit for storing a plurality of plural-stage address information table, which stores address informations for plural headers on plural stages; and an address retrieving unit functionally coupled to said packet storage unit and said address information storage unit, wherein said address retrieving unit batch-extracts data for said plural headers on said plural stages from said address information storage unit and performs a batch-retrieval to at least one of said plurality of plural-stage address information table based on said data for said plural headers, and wherein said address retrieving unit generates at least one first-retrieval key from an external header information of said packet stored in said packet storage unit, said address retrieving unit also performs a first-retrieval to at least one of said plurality of address information table based on said at least one first-retrieval key and receives a first-returned value, which depends upon a first-retrieval result made, from said address information storage unit, said first-returned value indicating the presence or absence of any internal header in said packet.

6. The system as claimed in claim 5, wherein said address retrieving unit further comprises:

a header data extracting unit for batch-extracting said data for said plural headers on said plural stages from said address information storage unit; and a retrieving unit functionally coupled to said header data extracting unit for receiving said data for said plural headers and performing a batch-retrieval to said at least one of said plurality of plural-stage address information table based on said data for said plural headers.

7. The system as claimed in claim 6, wherein said address retrieving unit further comprises:

a header converting unit functionally coupled to said retrieving unit for receiving a retrieval result from said retrieving unit, and said header converting unit rewriting a header of said packet stored in said packet storage unit based on said retrieving result.

8. The system as claimed in claim 5, wherein said address retrieving unit comprises a hardware.

9. A system for retrieving a destination address of a packet, comprising:

a packet receiving unit for receiving a packet which has plural-staged headers having respective destination addresses;

a packet storage unit functionally coupled to said packet receiving unit for receiving said packet from said packet receiving unit and storing said packet;

an address information storage unit for storing a plurality of address information table, which stores address informations for each header; and an address retrieving unit functionally coupled to said packet storage unit and said address information storage unit and further to said packet receiving unit, wherein said address retrieving unit generates at least one retrieval key from a header information of a header at a position designated by an extracting-position designating information given to said packet stored in said packet storage unit, said address retrieving unit also performs a retrieval to at least one of said plurality of address information table based on said at least one retrieval key and receives a returned value, which depends upon a retrieval result made, from said address information storage unit, said first-returned value indicating the presence or absence of any internal header in said packet, and if said returned value indicates the presence of any internal header in said packet, then said address retrieving unit provides said packet with a new extracting-position designating information and sends said packet to said packet receiving unit.

10. The system as claimed in claim 9, wherein said address retrieving unit further comprises:

a retrieval key generating unit generating at least one retrieval key from a header information of a header at a position designated by an extracting-position designating information given to said packet stored in said packet storage unit;

a retrieving unit functionally coupled to said retrieval key generating unit, said retrieving unit performing a retrieval to at least one of said plurality of address information table and receiving said returned value, which depends upon a retrieval result made, from said address information storage unit, and said retrieving unit also issuing a feed-back process instruction; and a transferring unit functionally coupled to said retrieving unit for receiving said feed-back process instruction from said retrieving unit and providing said packet with a new extracting-position designating information and sends said packet to said packet receiving unit.

11. The system as claimed in claim 10, wherein said address retrieving unit further comprises:

a header converting unit functionally coupled to said retrieving unit for receiving said retrieval result from said retrieving unit, and said header converting unit rewriting a header of said packet stored in said packet storage unit based on said retrieving result.

12. The system as claimed in claim 9, wherein said address retrieving unit comprises a hardware.

* * * * *